United States Patent
You et al.

(10) Patent No.: US 10,570,221 B2
(45) Date of Patent: Feb. 25, 2020

(54) METALLOCENE SUPPORTED CATALYST AND METHOD FOR PREPARING POLYOLEFIN USING THE SAME

(71) Applicant: LG Chem, Ltd., Seoul (KR)

(72) Inventors: Young Suk You, Daejeon (KR); Sung Ho Park, Daejeon (KR); Ki Soo Lee, Daejeon (KR); Heon Yong Kwon, Daejeon (KR); Dae Sik Hong, Daejeon (KR); Eun Young Shin, Daejeon (KR); Hyun Jee Kwon, Daejeon (KR); Jin Young Lee, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/764,758

(22) PCT Filed: Dec. 22, 2016

(86) PCT No.: PCT/KR2016/015129
§ 371 (c)(1),
(2) Date: Mar. 29, 2018

(87) PCT Pub. No.: WO2017/111513
PCT Pub. Date: Jun. 29, 2017

(65) Prior Publication Data
US 2018/0282442 A1    Oct. 4, 2018

(30) Foreign Application Priority Data
Dec. 23, 2015   (KR) .................. 10-2015-0185303

(51) Int. Cl.
| | | |
|---|---|---|
| *C08F 4/6592* | (2006.01) |
| *C08F 110/02* | (2006.01) |
| *C08F 10/00* | (2006.01) |
| *B01J 31/22* | (2006.01) |
| *C08F 2/34* | (2006.01) |
| *C08F 10/02* | (2006.01) |
| *C08F 10/04* | (2006.01) |
| *C08F 10/14* | (2006.01) |
| *C08F 210/16* | (2006.01) |
| *C08F 4/10* | (2006.01) |
| *C08F 4/12* | (2006.01) |

(52) U.S. Cl.
CPC ......... *C08F 4/6592* (2013.01); *B01J 31/2295* (2013.01); *C08F 2/34* (2013.01); *C08F 10/02* (2013.01); *C08F 10/04* (2013.01); *C08F 10/14* (2013.01); *C08F 210/16* (2013.01); *B01J 2531/0233* (2013.01); *C08F 4/10* (2013.01); *C08F 4/12* (2013.01)

(58) Field of Classification Search
CPC .............. C08F 4/65908; C08F 4/65912; C08F 4/65916; C08F 210/16; C08F 4/6592; C08F 10/00; C08F 110/02
See application file for complete search history.

(56) References Cited

U.S. PATENT DOCUMENTS

| | | | |
|---|---|---|---|
| 5,032,562 A | 7/1991 | Lo et al. | |
| 5,525,678 A | 6/1996 | Mink et al. | |
| 5,914,289 A | 6/1999 | Razavi | |
| 6,933,353 B2* | 8/2005 | Wang | C08F 210/16 526/114 |
| 7,915,358 B2* | 3/2011 | Ikeda | C08F 210/16 526/113 |
| 8,680,218 B1 | 3/2014 | Yang et al. | |
| 2003/0078457 A1 | 4/2003 | Harthun et al. | |
| 2003/0203809 A1* | 10/2003 | Kao | C08F 210/16 502/150 |
| 2005/0113243 A1 | 5/2005 | Thorn et al. | |
| 2005/0153830 A1 | 7/2005 | Jensen et al. | |
| 2007/0004881 A1 | 1/2007 | Wang et al. | |
| 2009/0227746 A1 | 9/2009 | Hatakeyama et al. | |
| 2010/0010180 A1 | 1/2010 | Prades et al. | |
| 2011/0282016 A1 | 11/2011 | Carter et al. | |
| 2014/0088265 A1 | 3/2014 | Crowther et al. | |
| 2014/0206828 A1* | 7/2014 | Kwon | C08F 10/00 526/132 |

FOREIGN PATENT DOCUMENTS

| | | |
|---|---|---|
| CN | 1053432 A | 7/1991 |
| CN | 1478105 A | 2/2004 |
| CN | 1890270 A | 1/2007 |
| CN | 101263163 A | 9/2008 |
| CN | 100455609 C | 1/2009 |
| CN | 103965379 A | 8/2014 |
| EP | 0819706 A1 | 1/1998 |
| JP | H09157319 A | 6/1997 |
| JP | 2007520597 A | 7/2007 |

(Continued)

OTHER PUBLICATIONS

International Search Report for Application No. PCT/KR2016/015129 dated Apr. 5, 2017.
Kaminsky, "Discovery of Methylaluminoxane as Cocatalyst for Olefin Polymerization", Macromolecules, American Chemical Society, Mar. 8, 2012, vol. 45, pp. 3289-3297.
Wang, "Effect of Diethylzinc on the Activity of Ethylene Polymerization by Metallocene Catalyst", Macromolecular Reaction Engineering, Feb. 4, 2015, vol. 9, No. 4, pp. 333-338.
Chinese Search Report for Application No. 201680059011.4 dated Dec. 11, 2019, 2 pages.

*Primary Examiner* — Caixia Lu

(74) *Attorney, Agent, or Firm* — Lerner, David, Littenberg, Krumholz & Mentlik, LLP

(57) ABSTRACT

The present invention provides a metallocene supported catalyst that can prepare a polyolefin having excellent transparency even when processed into a film, as well as excellent processibility and mechanical properties, with high catalytic activity, and a method for preparing a polyolefin using the same.

9 Claims, No Drawings

(56) References Cited

FOREIGN PATENT DOCUMENTS

| | | | |
|---|---|---|---|
| JP | 2013253264 | A | 12/2013 |
| KR | 19980020720 | A | 6/1998 |
| KR | 20040076965 | A | 9/2004 |
| KR | 100677685 | B1 | 1/2007 |
| KR | 100895599 | B1 | 5/2009 |
| KR | 101235390 | B1 | 2/2013 |
| KR | 101265891 | B1 | 5/2013 |
| WO | 98009996 | A1 | 3/1998 |
| WO | 04/076502 | A1 | 9/2004 |
| WO | 2013158253 | A1 | 10/2013 |

* cited by examiner

METALLOCENE SUPPORTED CATALYST AND METHOD FOR PREPARING POLYOLEFIN USING THE SAME

CROSS-REFERENCE TO RELATED APPLICATIONS

The present application is a national phase entry under 35 U.S.C. § 371 of International Application No. PCT/KR2016/015129 filed Dec. 22, 2016, which claims priority from Korean Patent Application No. 10-2015-0185303, filed on Dec. 23, 2015, the disclosures of which are incorporated herein by reference

TECHNICAL FIELD

The present invention relates to a metallocene supported catalyst that can prepare a polyolefin having excellent transparency even when processed into a film, as well as excellent processability and mechanical properties, with high catalytic activity, and a method for preparing a polyolefin using the same.

BACKGROUND OF THE INVENTION

Olefin polymerization systems are divided into Ziegler-Natta and metallocene catalyst systems, and these two highly active catalyst systems have been developed corresponding to particular characteristics. The Ziegler-Natta catalyst has been widely applied in existing commercial processes since it was invented in the fifties, but since it is a multi-site catalyst with several active sites, it is characterized by a wide molecular weight distribution of a polymer, and is limited in terms of securing of desired properties due to a non-uniform composition distribution of comonomers.

Meanwhile, the metallocene catalyst consists of a main catalyst, of which a main component is a transition metal compound, and a cocatalyst, which is an organometal compound including aluminum as the main component, and as such a catalyst is a homogeneous complex catalyst and a single site catalyst, it obtains a polymer with a narrow molecular weight distribution and a uniform comonomer composition distribution according to the properties of the single site catalyst, and can change the stereoregularity, copolymerization property, molecular weight, crystallinity, etc. according to modification of the ligand structure of the catalyst and change of polymerization conditions.

U.S. Pat. No. 5,032,562 describes a method for preparing a polymerization catalyst by supporting two different transition metal catalysts on one carrier. This is a method of producing a bimodal distribution polymer by supporting a titanium (Ti)-based Ziegler-Natta catalyst producing a high molecular weight and a zirconium (Zr)-based metallocene catalyst producing a low molecular weight on one carrier, and has disadvantages in that the supporting process is complicated, and polymer morphology is deteriorated due to the cocatalyst.

U.S. Pat. No. 5,525,678 describes a method of using a catalyst system for olefin polymerization that simultaneously supports a metallocene compound and a non-metallocene compound on a carrier, thus simultaneously polymerizing a high molecular weight polymer and a low molecular weight polymer. It has disadvantages in that the metallocene compound and the non-metallocene compound should be separately supported, and the carrier should be pretreated with many compounds for supporting.

U.S. Pat. No. 5,914,289 describes a method of controlling the molecular weight and molecular weight distribution of a polymer using metallocene catalysts supported on each carrier, but a large amount of solvent is required when preparing the supported catalyst and a long preparation time is required, and the used metallocene catalysts should be respectively supported on a carrier, which is inconvenient.

Korean Patent Application No. 2003-12308 discloses a method of controlling molecular weight distribution by supporting a binuclear metallocene catalyst and a mononuclear metallocene catalyst on a carrier together with an activator, and polymerizing while changing combinations of catalysts in the reactor. However, this method is limited in terms of simultaneous realization of the properties of each catalyst, and has disadvantages in that the metallocene catalyst part is isolated from the carrier component of the finished catalyst to induce fouling in the reactor.

Further, in the case of a copolymer of ethylene and an alpha-olefin polymerized using most transition metal compounds, a narrow molecular weight distribution is exhibited compared to a polyolefin obtained through the existing high pressure process, but in terms of the polymer structure, long chain branches are not included or a relatively small amount of long chain branches are included. Recently, there have been active attempts to obtain a polyolefin copolymer with a polymer structure having long chain branches and various properties in the academic and industrial worlds, but development of novel catalysts and processes for this are still required. Particularly, there is a continued demand for the development of catalysts with excellent performance that include long chain branches and thus can secure excellent processability and mechanical properties, and simultaneously, have excellent transparency even when processed into a film.

DETAILS OF THE INVENTION

Objects of the Invention

In order to solve the problems of the prior art, it is an object of the present invention to provide a metallocene supported catalyst that can prepare a polyolefin having excellent transparency even when processed into a film as well as excellent processability and mechanical properties with high catalytic activity, a method for preparing a polyolefin using the same, and a polyolefin prepared thereby.

Means for Achieving the Object

In order to achieve the object, one aspect of the present invention provides a metallocene supported catalyst including one or more kinds of metallocene compounds, two or more kinds of cocatalyst compounds, and a carrier, wherein among the cocatalyst compounds, a first cocatalyst compound is a compound represented by the following Chemical Formula 1 and a second cocatalyst compound is diethyl zinc, and the diethyl zinc is included in the content of 0.1 to 3 mmol/g, based on the weight (g) of the carrier, and at least a part thereof is supported on the first cocatalyst compound.

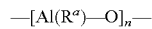 [Chemical Formula 1]

In Chemical Formula 1, each $R^a$ may be identical to or different from each other, and each are independently a halogen, a C1-20 hydrocarbon, or a C1-20 hydrocarbon substituted with a halogen; and n is an integer of 2 or more.

The compound represented by Chemical Formula 1 may be methylaluminoxane, ethylaluminoxane, isobutylaluminoxane, butylaluminoxane, etc.

In the metallocene supported catalyst of the present invention, the metallocene compound may be one or more represented by the following Chemical Formulas 2 to 5.

$$(Cp^5R^b)_n(Cp^6R^c)M^1Z^1_{3-n} \quad \text{[Chemical Formula 2]}$$

In Chemical Formula 2, $M^1$ is Group 4 transition metal;

$Cp^5$ and $Cp^6$ are identical to or different from each other, and are independently one selected from the group consisting of cyclopentadienyl, indenyl, 4,5,6,7-tetrahydro-1-indenyl, and fluorenyl radicals, which may be substituted with a C1-20 hydrocarbon;

$R^b$ and $R^c$ are identical to or different from each other, and are independently hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^1$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy; and n is 1 or 0.

$$(Cp^7R^d)_mB^1(Cp^8R^e)M^2Z^2_{3-m} \quad \text{[Chemical Formula 3]}$$

In Chemical Formula 3, $M^2$ is Group 4 transition metal;

$Cp^7$ and $Cp^8$ are identical to or different from each other, and are independently one selected from the group consisting of cyclopentadienyl, indenyl, 4,5,6,7-tetrahydro-1-indenyl, and fluorenyl radicals, which may be substituted with a C1-20 hydrocarbon;

$R^d$ and $R^e$ are identical to or different from each other, and are independently hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^2$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy;

$B^1$ is one or more selected from carbon, germanium, silicon, phosphorous, or nitrogen atom-containing radicals or a combination thereof, which crosslinks the $Cp^7R^d$ ring with the $Cp^8R^e$ ring, or crosslinks one $Cp^8R^e$ ring to $M^2$; and m is 1 or 0.

$$(Cp^9R^f)B^2(J)M^3Z^3_2 \quad \text{[Chemical Formula 4]}$$

In Chemical Formula 4, $M^3$ is a Group 4 transition metal;

$Cp^9$ is one selected from the group consisting of cyclopentadienyl, indenyl, 4,5,6,7-tetrahydro-1-indenyl, and fluorenyl radicals, which may be substituted with a C1-20 hydrocarbon;

$R^f$ is hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^3$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy;

$B^2$ is one or more selected from carbon, germanium, silicon, phosphorous, or nitrogen atom-containing radicals or a combination thereof, which crosslinks the $Cp^9R^f$ ring with J; and J is one selected from the group consisting of $NR^g$, O, $PR^g$, and S, and $R^g$ is a C1-20 alkyl, aryl, substituted alkyl, or substituted aryl.

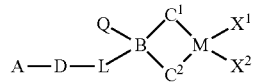

[Chemical Formula 5]

In Chemical Formula 5,

A is hydrogen, a halogen, a C1-20 alkyl, a C2-20 alkenyl, a C6-20 aryl, a C7-20 alkylaryl, a C7-20 arylalkyl, a C1-20 alkoxy, a C2-20 alkoxyalkyl, a C3-20 heterocycloalkyl, or a C5-20 heteroaryl;

D is —O—, —S—, —N(R)—, or —Si(R)(R')—, wherein R and R' are identical to or different from each other, and are independently hydrogen, a halogen, a C1-20 alkyl, a C2-20 alkenyl, or a C6-20 aryl;

L is a C1-10 linear or branched alkylene group;

B is carbon, silicon, or germanium;

Q is hydrogen, a halogen, a C1-20 alkyl, a C2-20 alkenyl, a C6-20 aryl, a C7-20 alkylaryl, or a C7-20 arylalkyl;

M is a Group 4 transition metal;

$X^1$ and $X^2$ are identical to or different from each other, and are independently a halogen, a C1-20 alkyl, a C2-20 alkenyl, a C6-20 aryl, a nitro, an amido, a C1-20 alkylsilyl, a C1-20 alkoxy, or a C1-20 sulfonate group; and $C^1$ and $C^2$ are identical to or different from each other, and are independently represented by one of the following Chemical Formula 6a, Chemical Formula 6b, and Chemical Formula 6c, provided that both $C^1$ and $C^2$ are not Chemical Formula 6c.

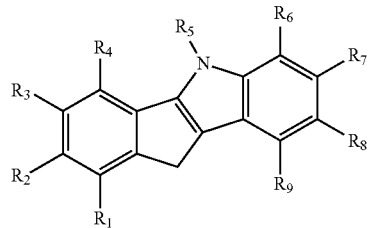

[Chemical Formula 6a]

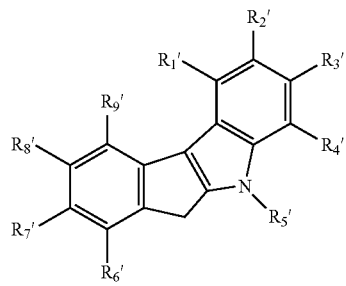

[Chemical Formula 6b]

[Chemical Formula 6c]

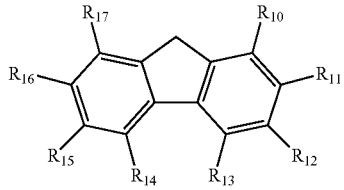

In Chemical Formulas 6a, 6b, and 6c, R1 to R17 and R1' to R9' are identical to or different from each other, and are independently hydrogen, a halogen, a C1-20 alkyl, a C2-20 alkenyl, a C1-20 alkylsilyl, a C1-20 silylalkyl, a C1-20 alkoxysilyl, a C1-20 alkoxy, a C6-20 aryl, a C7-20 alkylaryl, or a C7-20 arylalkyl group, and two or more neighboring groups of the R10 to R17 may be linked to form a substituted or unsubstituted aliphatic or aromatic ring.

For example, the metallocene supported catalyst may further include one or more kinds of cocatalyst compounds selected from the compounds represented by the following Chemical Formula 7 or Chemical Formula 8.

$$J(R_{23})_3 \qquad \text{[Chemical Formula 7]}$$

In Chemical Formula 7,
each $R_{23}$ may be identical to or different from each other, and are independently a halogen, a C1-20 hydrocarbon, or a C1-20 hydrocarbon substituted with a halogen; and
J is aluminum or boron.

$$[E\text{-}H]^+[ZA'_4]^- \text{ or } [E]^+[ZA'_4]^- \qquad \text{[Chemical Formula 8]}$$

In Chemical Formula 8,
E is a neutral or cationic Lewis acid;
H is a hydrogen atom;
Z is a Group 13 atom; and
each A may be identical to or different from each other, and are independently a halogen with a hydrogen valence of one or more, a C1-20 hydrocarbon, a C6-20 aryl, or a C1-20 alkyl group unsubstituted or substituted with alkoxy or phenoxy.

The carrier may be one or more selected from the group consisting of silica, silica-alumina, and silica-magnesia.

Meanwhile, the present invention provides a method for preparing the metallocene supported catalyst. The method for preparing the metallocene supported catalyst includes the steps of supporting two or more kinds of cocatalyst compounds on a carrier, and then supporting one or more kinds of metallocene compounds, wherein among the cocatalyst compounds, the first cocatalyst compound is a compound represented by the following Chemical Formula 1 and the second cocatalyst compound is diethyl zinc, and the diethyl zinc is supported in the content of 0.1 to 3 mmol/g based on the weight (g) of the carrier, after the first cocatalyst compound is supported.

$$-[\text{Al}(R^a)-\text{O}]_n- \qquad \text{[Chemical Formula 1]}$$

In Chemical Formula 1,
each $R^a$ may be identical to or different from each other, and are independently a halogen, a C1-20 hydrocarbon, or a C1-20 hydrocarbon substituted with a halogen, and
n is an integer of 2 or more.

The present invention further provides a method for preparing a polyolefin including the step of polymerizing olefin monomers in the presence of the above-described catalyst.

The present invention also provides a polyolefin prepared according to the above-described method.

Effects of the Invention

The metallocene supported catalyst according to the present invention can effectively prepare a polyolefin having excellent transparency even when processed into a film, as well as excellent processability and mechanical properties.

Particularly, the present invention has excellent effects of an increase in catalytic activity, stabilization of polymer morphology, and capabilities of controlling molecular weight distribution (MWD) and maintaining high process stability.

DETAILED DESCRIPTION OF THE EMBODIMENTS

As used herein, terms "first", "second" and the like are used to explain various constructional elements, but they are used only to distinguish one constructional element from other constructional elements.

Further, the terms used herein are only to explain illustrative examples, and are not intended to limit the present invention. A singular expression includes a plural expression thereof, unless it is expressly stated or obvious from the context that such is not intended. As used herein, the terms "comprise", "have", etc. are intended to designate the existence of practiced characteristics, numbers, steps, constructional elements, or combinations thereof, and they are not intended to preclude the possibility of existence or addition of one or more other characteristics, numbers, steps, constructional elements, or combinations thereof.

Although various modifications can be made to the present invention and the present invention may have various forms, specific examples will be illustrated and explained in detail below. However, it should be understood that these are not intended to limit the present invention to specific disclosures, and that the present invention includes all modifications, equivalents, or replacements thereof without departing from the spirit and technical scope of the invention.

Hereinafter, the present invention will be explained in more detail.

The metallocene supported catalyst according to the present invention includes one or more kinds of metallocene compounds, two or more kinds of cocatalyst compounds, and a carrier, wherein among the cocatalyst compounds, a first cocatalyst compound is a compound represented by the following Chemical Formula 1 and a second cocatalyst compound is diethyl zinc, and the diethyl zinc is included in the content of 0.1 to 3 mmol/g based on the weight (g) of the carrier, and at least a part thereof is supported on the first cocatalyst compound:

$$-[\text{Al}(R^a)-\text{O}]_n- \qquad \text{[Chemical Formula 1]}$$

wherein, in Chemical Formula 1,
each $R^a$ may be identical to or different from each other, and are independently a halogen, a C1-20 hydrocarbon, or a C1-20 hydrocarbon substituted with a halogen; and
n is an integer of 2 or more.

The present invention can provide a metallocene supported catalyst that simultaneously satisfies processability and transparency of a polyolefin, by introducing diethyl zinc in a predetermined content range as a cocatalyst compound during the preparation of a supported catalyst, instead of a separate polymerization process. In general, long chain branch (LCB)-expressing catalysts are known to exhibit excellent processability while maintaining the properties of PE (polyethylene), etc. In order to develop such properties, many researchers have developed various products using the LCB property in a polymer. However, the existing products have disadvantages in that although excellent processability and properties may be confirmed, since transparency, which is the most important property in film products, is largely dependent upon the LCB expression degree in a polymer, if the content of the LCB that increases processability is increased, transparency may be deteriorated.

Accordingly, the present invention introduces a predetermined amount of diethyl zinc when supporting a catalyst, thereby improving the transparency of the polymer while maintaining the LCB content, and thus, can develop high processability, high transparency mLLLD films. Particularly, the metallocene supported catalyst according to the present invention has advantages in that there is no problem in terms of polymerization stability because diethyl zinc is not added during polymerization, and that it does not have an influence on the color of a produced polymer because the intrinsic activity of the catalyst is not damaged.

Particularly, the metallocene supported catalyst of the present invention is characterized by including the aluminoxane compound of Chemical Formula 1 as the first cocatalyst compound and diethyl zinc as the second cocatalyst compound, among the cocatalyst compounds. Here, the compound represented by Chemical Formula 1 may be methylaluminoxane, ethylaluminoxane, isobutylaluminoxane, or butylaluminoxane, etc.

In the metallocene supported catalyst of the present invention, chain transfer between the second cocatalyst compound, diethyl zinc, with the alkyl group, etc. included in the first cocatalyst compound is achieved, and activity inhibition factors such as trimethylaluminum (TMA), etc. may be decreased to obtain an activity increase effect. As such, since zinc included in the second cocatalyst has a relatively low ionization degree compared to aluminum included in the first cocatalyst compound, reactivity between the two metals due to oxidation/reduction exists, thus achieving an increase in the catalytic activity. Further, in the catalyst of the present invention, separately from the chain transfer capability of diethyl zinc, the aluminoxane compound of Chemical Formula 1 generates species including methylethylaluminum, etc., thus also decreasing activity inhibition factors and increasing catalytic activity.

As such, the first cocatalyst compound and the second cocatalyst compound may be included in the form of a compound produced through the chain transfer reaction. Particularly, the second cocatalyst compound, diethyl zinc, may be included as a coordinated component wherein a methyl or halide, etc. exists, between the first cocatalyst compound and the metallocene precursor. That is, the zinc compounds produced through the chain transfer with the second cocatalyst may include dimethyl zinc (DMZ), ethylmethyl zinc, or a mixture thereof. The organic zinc with less steric hindrance compared to diethyl zinc may exist while forming a coordination bond with the oxygen atom of the first cocatalyst compound, or it may react with the catalyst precursor metallocene compound and exist in the form of a zinc halide.

Particularly, the metallocene supported catalyst of the present invention may be expected to have chain transfer and chain shuttling effects, which are effects of the diethyl zinc. The diethyl zinc may be included in the content of 0.01 to 3 mmol/g, preferably 0.01 to 1 mmol/g, and more preferably 0.01 to 0.5 mmol/g, based on the weight (g) of the carrier. The diethyl zinc should be included in the content of 0.01 mmol/g or more so as to induce modification of molecular weight distribution (MWD), and should be included in the content of 3 mmol/g or less so as to prevent degeneration of polymer properties.

Further, the diethyl zinc may be included in the content of 0.1 to 30 parts by weight, preferably 0.1 to 24 parts by weight, and more preferably 0.1 to 23 parts by weight, based on the weight of the catalyst precursor metallocene compound. The diethyl zinc may be included in the content of 0.1 parts by weight or more, so as to induce an effective increase in catalytic activity and modification of molecular weight distribution (MWD). On the other hand, if excessive DEZ is used, the properties of the polymer may be changed by the DEZ, but activity deterioration or polymer color change may be caused according to the amount of DEZ, and if unreacted DEZ exists in a commercial process, process stability may be hindered, and thus it is preferable that the diethyl zinc is included in the content of 30 parts by weight or less, based on the weight of the metallocene compound. As such, according to the present invention, the properties of the polymer may be changed with the amount of DEZ that is about 0.1 times to about 30 times less than the amount of the precursor, and DEZ is pretreated in the supported catalyst instead of being introduced during the process, thus minimizing unreacted DEZ and securing excellent process stability.

Meanwhile, in the supported catalyst of the present invention, as the metallocene compound, those known to be used in catalysts for preparing a polyolefin may be used without specific limitations. Specific examples of the metallocene compounds may include those represented by one of the following Chemical Formulas 2 to 5.

$$(Cp^5R^b)_n(Cp^6R^c)M^1Z^1_{3-n} \quad \text{[Chemical Formula 2]}$$

In Chemical Formula 2,
$M^1$ is Group 4 transition metal;
$Cp^5$ and $Cp^6$ are identical to or different from each other, and are independently one selected from the group consisting of cyclopentadienyl, indenyl, 4,5,6,7-tetrahydro-1-indenyl, and fluorenyl radicals, which may be substituted with a C1-20 hydrocarbon;
$R^b$ and $R^c$ are identical to or different from each other, and are independently hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;
$Z^1$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy; and
n is 1 or 0.

$$(Cp^7R^d)_mB^1(Cp^8R^e)M^2Z^2_{3-m} \quad \text{[Chemical Formula 3]}$$

In Chemical Formula 3,
$M^2$ is Group 4 transition metal;
$Cp^7$ and $Cp^8$ are identical to or different from each other, and are independently one selected from the group consisting of cyclopentadienyl, indenyl, 4,5,6,7-tetrahydro-1-indenyl, and fluorenyl radicals, which may be substituted with a C1-20 hydrocarbon;
$R^d$ and $R^e$ are identical to or different from each other, and are independently hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^2$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy;

$B^1$ is one or more of carbon, germanium, silicon, phosphorous, and nitrogen atom-containing radicals or a combination thereof, which crosslinks the $Cp^7R^d$ ring with the $Cp^8R^e$ ring, or crosslinks one $Cp^8R^e$ ring to $M^2$; and m is 1 or 0.

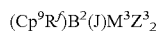   [Chemical Formula 4]

In Chemical Formula 4, $M^3$ is Group 4 transition metal;

$Cp^9$ is one selected from the group consisting of cyclopentadienyl, indenyl, 4,5,6,7-tetrahydro-1-indenyl, and fluorenyl radicals, which may be substituted with a C1-20 hydrocarbon;

$R^f$ is hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^3$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy;

$B^2$ is one or more of carbon, germanium, silicon, phosphorous, and nitrogen atom-containing radicals or a combination thereof, which crosslinks the $Cp^9R^f$ ring with J; and J is one selected from the group consisting of $NR^g$, O, $PR^g$, and S, and $R^g$ is a C1-20 alkyl, aryl, substituted alkyl, or substituted aryl.

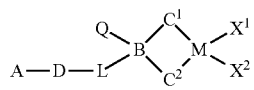   [Chemical Formula 5]

In Chemical Formula 5,

A is hydrogen, a halogen, a C1-20 alkyl, a C2-20 alkenyl, a C6-20 aryl, a C7-20 alkylaryl, a C7-20 arylalkyl, a C1-20 alkoxy, a C2-20 alkoxyalkyl, a C3-20 heterocycloalkyl, or a C5-20 heteroaryl;

D is —O—, —S—, —N(R)—, or —Si(R)(R')—, wherein R and R' are identical to or different from each other, and are independently hydrogen, a halogen, a C1-20 alkyl, a C2-20 alkenyl, or a C6-20 aryl;

L is a C1-10 linear or branched alkylene group;

B is carbon, silicon, or germanium;

Q is hydrogen, a halogen, a C1-20 alkyl, a C2-20 alkenyl, a C6-20 aryl, a C7-20 alkylaryl, or a C7-20 arylalkyl;

M is a Group 4 transition metal;

$X^1$ and $X^2$ are identical to or different from each other, and are independently a halogen, a C1-20 alkyl, a C2-20 alkenyl, a C6-20 aryl, a nitro, an amido, a C1-20 alkylsilyl, a C1-20 alkoxy, or a C1-20 sulfonate group;

$C^1$ and $C^2$ are identical to or different from each other, and are independently represented by one of the following Chemical Formula 6a, Chemical Formula 6b, and Chemical Formula 6c, provided that both $C^1$ and $C^2$ are not Chemical Formula 6c.

[Chemical Formula 6a]

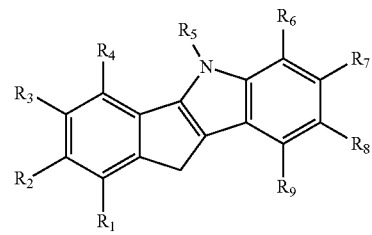

[Chemical Formula 6b]

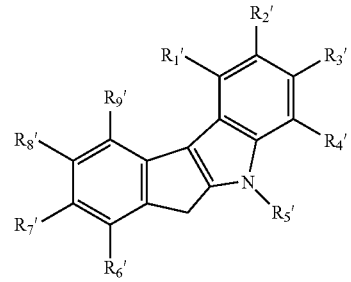

[Chemical Formula 6c]

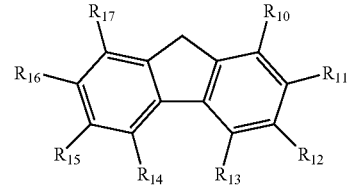

In Chemical Formulas 6a, 6b, and 6c, R1 to R17 and R1' to R9' are identical to or different from each other, and are independently hydrogen, a halogen, a C1-20 alkyl, a C2-20 alkenyl, a C1-20 alkylsilyl, a C1-20 silylalkyl, a C1-20 alkoxysilyl, a C1-20 alkoxy, a C6-20 aryl, a C7-20 alkylaryl, or a C7-20 arylalkyl group, and two or more neighboring groups of the R10 to R17 may be linked to form a substituted or unsubstituted aliphatic or aromatic ring.

Hereinafter, the metallocene compounds of Chemical Formulas 2 to 5 will be explained in more detail. In the metallocene supported catalyst of the present invention, two or more different kinds of metallocene compounds may be hybridized and used together, or only one kind of metallocene compound may be used.

The metallocene compound represented by Chemical Formula 2 may be a compound represented by one of the following structural formulas, for example, but is not limited thereto.

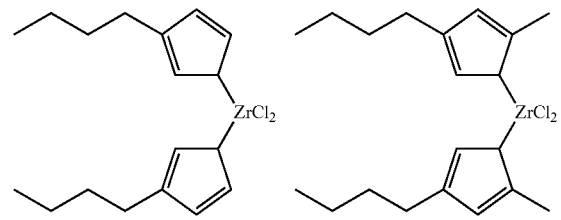

-continued
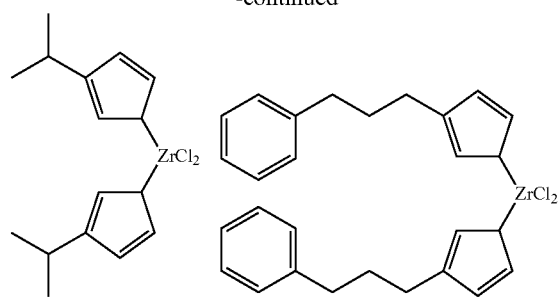
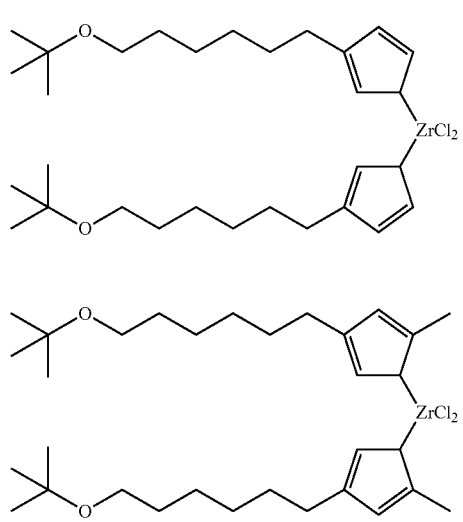
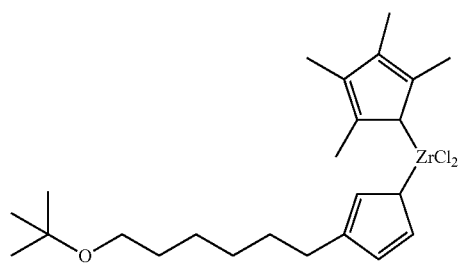
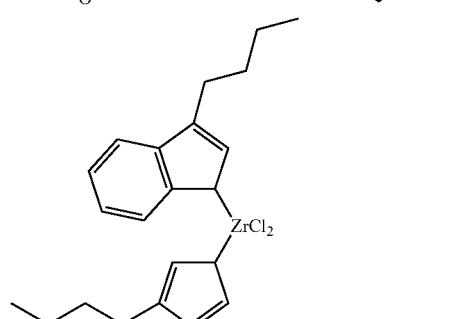
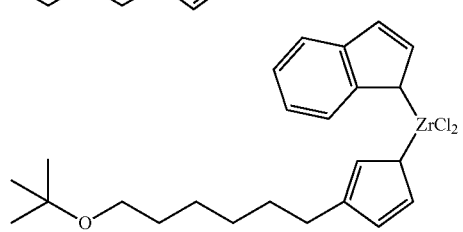
-continued
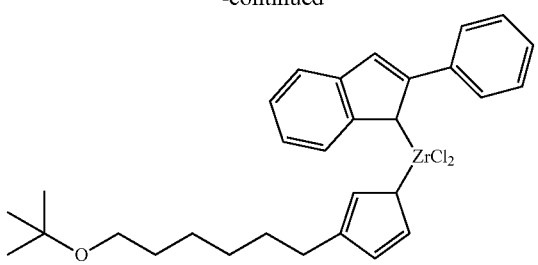
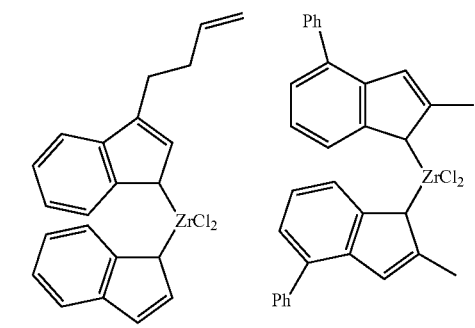
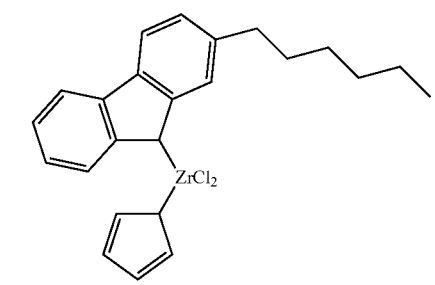
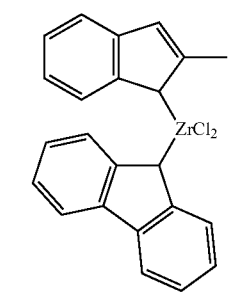
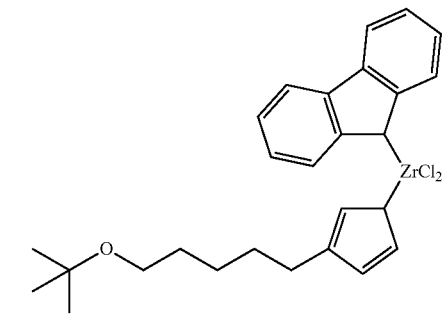

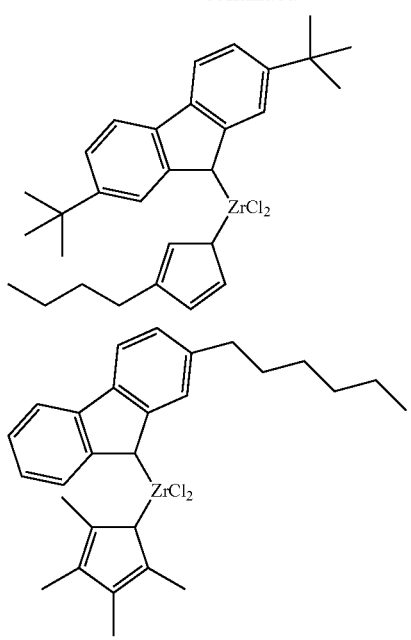
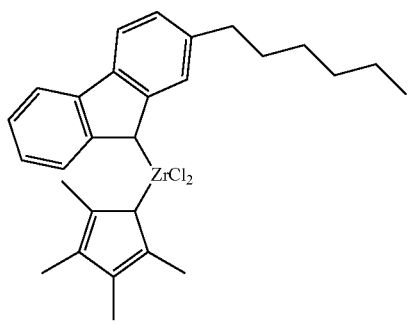
Further, the metallocene compound represented by Chemical Formula 3 may be a compound represented by one of the following structural formulas, for example, but is not limited thereto.
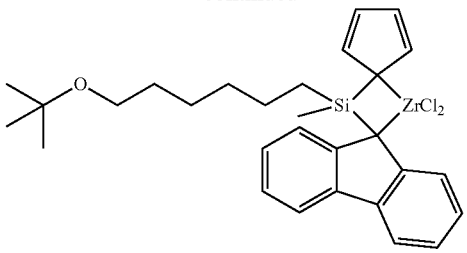
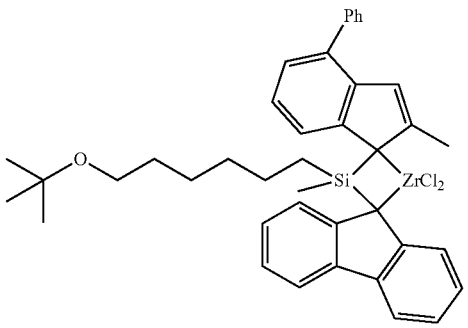
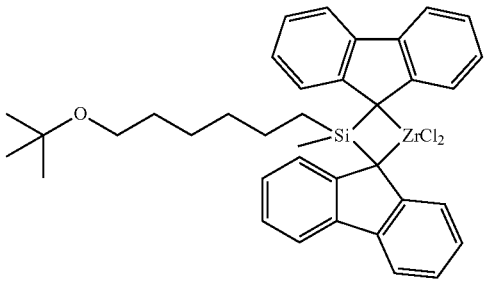
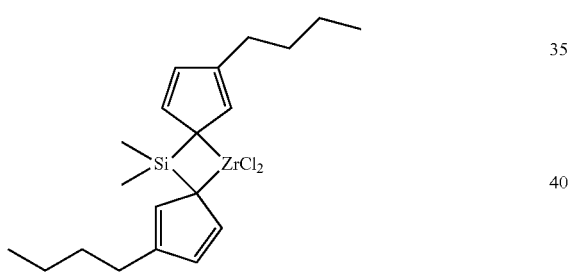
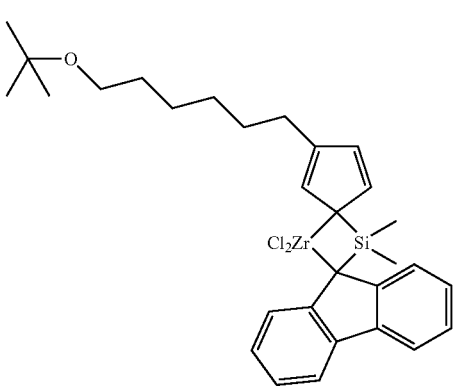
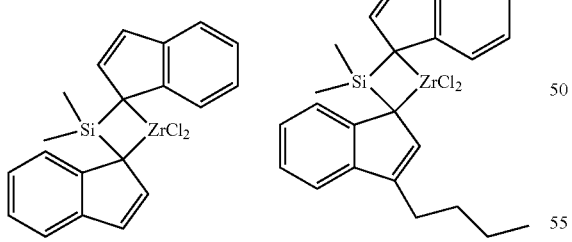
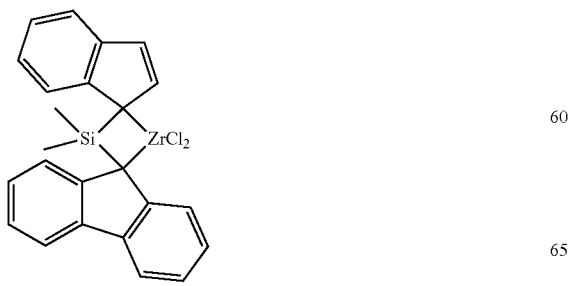
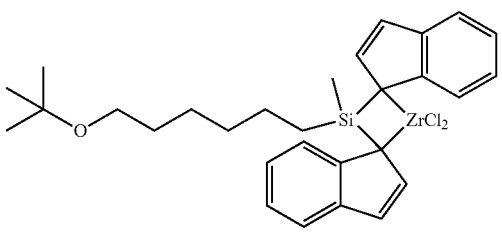

-continued
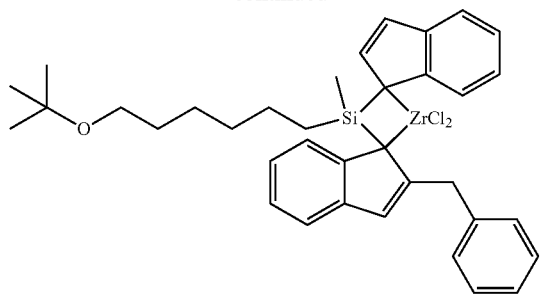
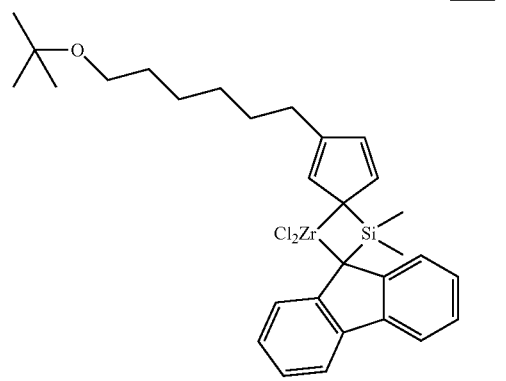
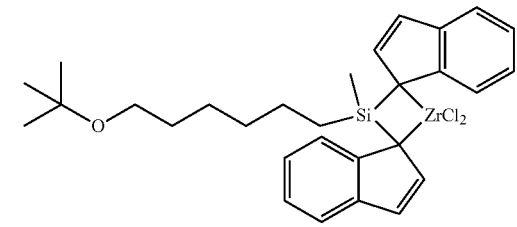
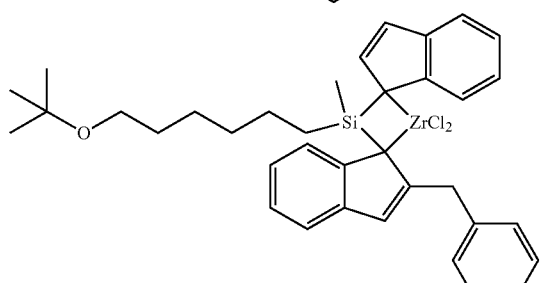
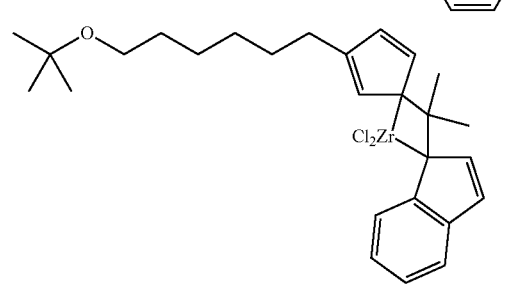
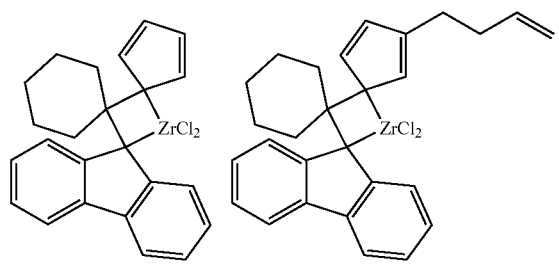
-continued
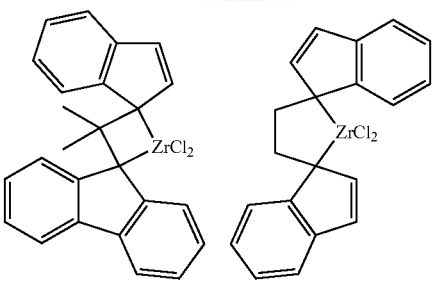
In addition, the metallocene compound represented by Chemical Formula 4 may be a compound represented by one of the following structural formulas, for example, but is not limited thereto.
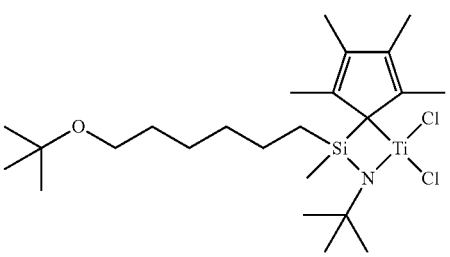
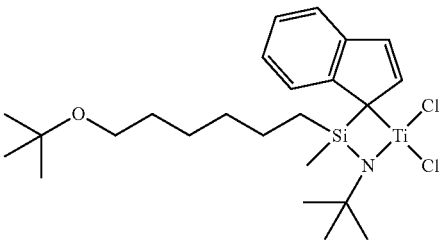
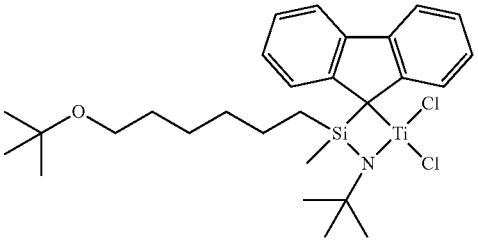
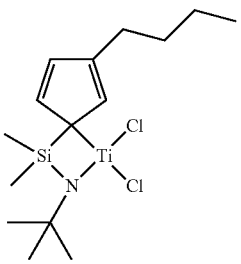

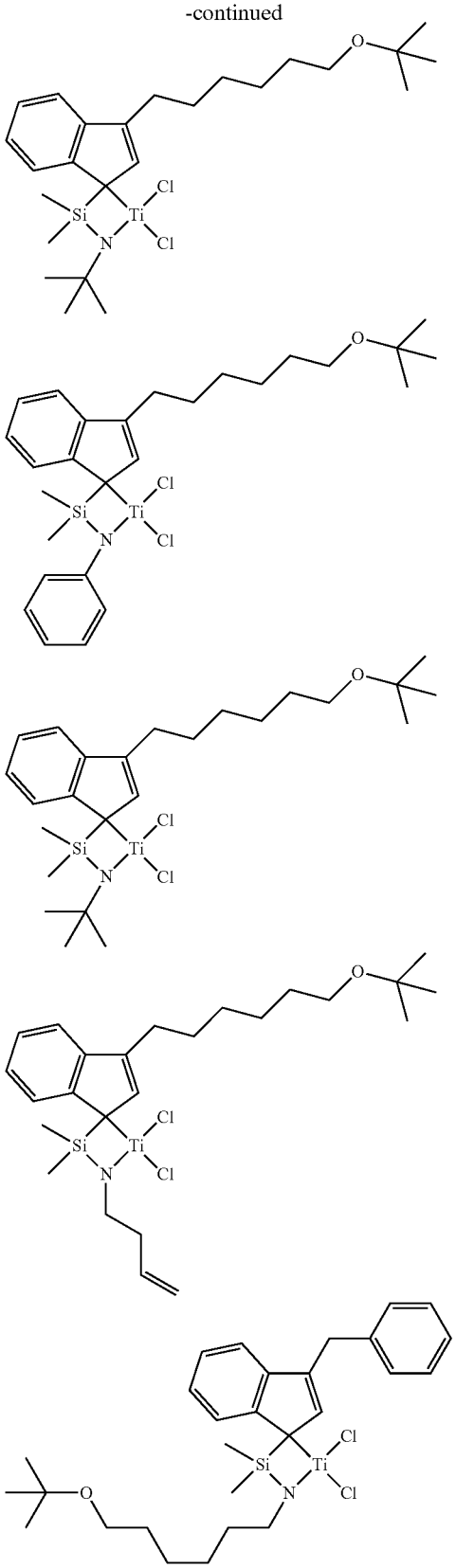

Further, in Chemical Formula 5, the Group 4 transition metal (M) may include titanium, zirconium, hafnium, etc., but is not limited thereto.

In the metallocene compound of Chemical Formula 5, it is more preferable for R1 to R17 and R1' to R9' of Chemical Formulas 6a, 6b, and 6c to each independently be hydrogen, methyl, ethyl, propyl, isopropyl, n-butyl, tert-butyl, pentyl, hexyl, heptyl, octyl, phenyl, halogen, trimethylsilyl, triethylsilyl, tripropylsilyl, tributylsilyl, triisopropylsilyl, trimethylsilylmethyl, methoxy, or ethoxy, but are not limited thereto.

In the metallocene compound of Chemical Formula 5, it is more preferable that L is a C4-8 linear or branched alkylene group, but is not limited thereto. The alkylene group may be unsubstituted or substituted with a C1-20 alkyl, a C2-20 alkenyl, or a C6-20 aryl group.

In the metallocene compound of Chemical Formula 5, it is preferable that A is hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl group, but is not limited thereto. It is also preferable that B is silicon, but is not limited thereto.

The metallocene compound of Chemical Formula 5 forms a structure wherein an indeno indole derivative and/or a fluorene derivative are crosslinked by a bridge, and has unshared electron pairs capable of acting as a Lewis base in the ligand structure, and thus, is supported on the carrier surface having a Lewis acid property, thereby exhibiting high polymerization activity even when supported. Further, since it includes an electron-rich indeno indole group and/or fluorine group, it has high activity, has low hydrogen reactivity due to appropriate steric hindrance and the electronic effect of the ligand, and maintains high activity even when hydrogen exists. The nitrogen atom of the indeno indole derivative stabilizes the beta-hydrogen of a growing polymer chain by hydrogen bonding to inhibit beta-hydrogen elimination, thus polymerizing a polyolefin with optimized molecular weight.

According to one embodiment of the invention, specific examples of the structure represented by Chemical Formula 6a may include the structures represented by one of the following structural formulas, but are not limited thereto.

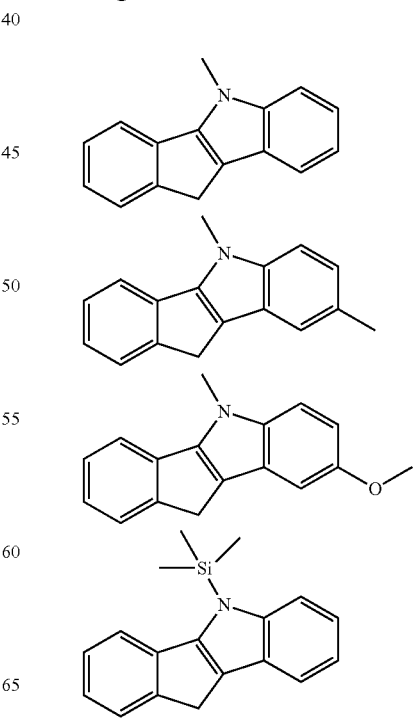

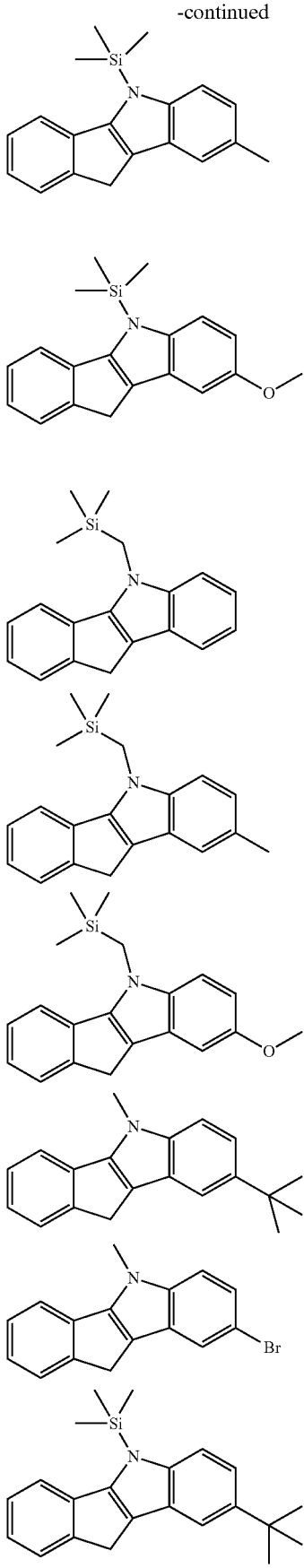
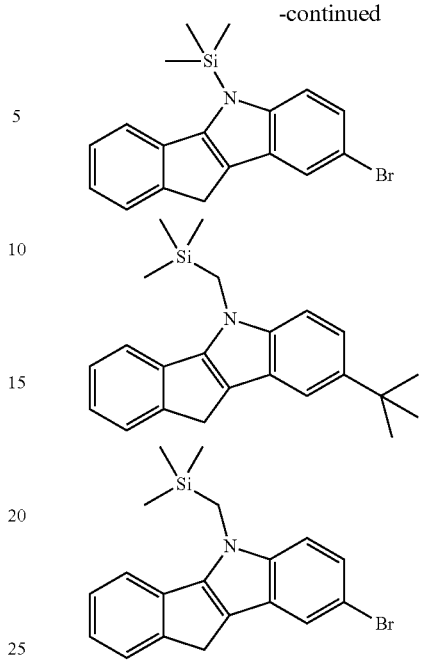
Specific examples of the structure represented by Chemical Formula 6b may include the structures represented by one of the following structural formulas, but are not limited thereto.
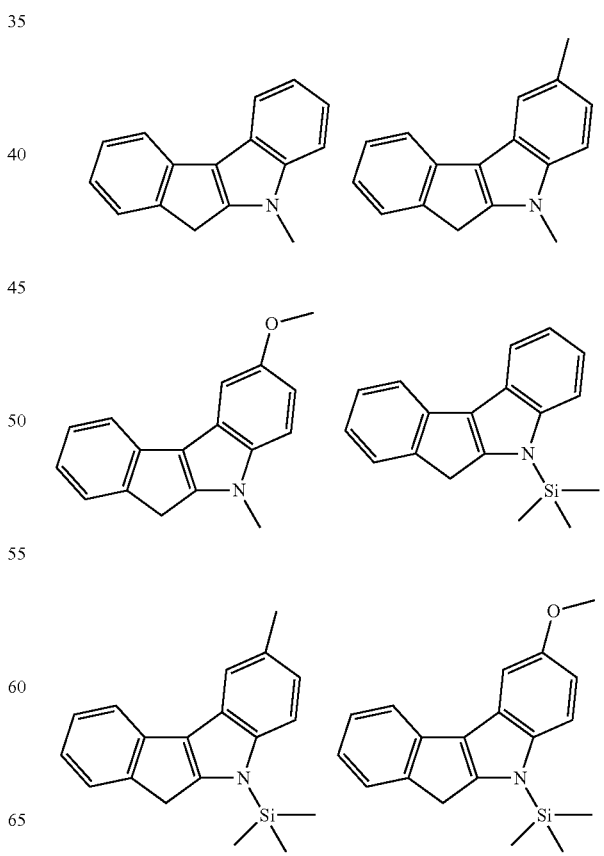

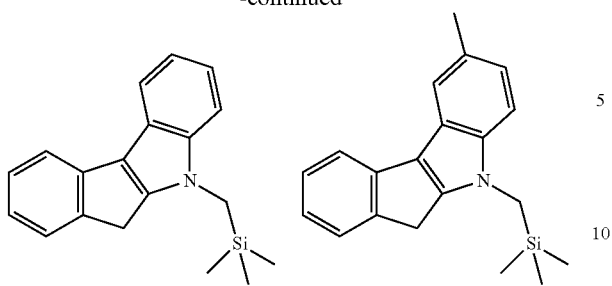

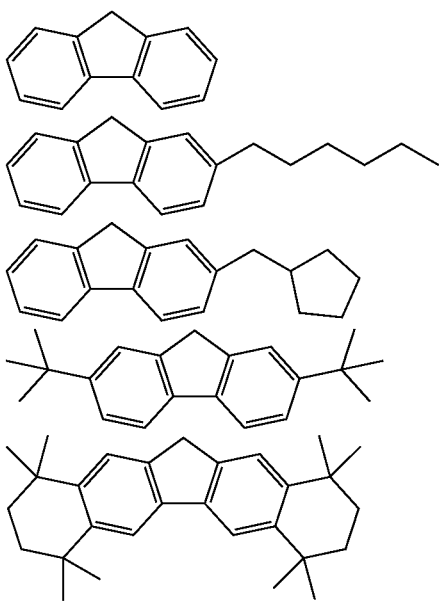

In addition, specific examples of the metallocene compound represented by Chemical Formula 5 may include the compounds represented by one of the following structural formulas, but are not limited thereto.

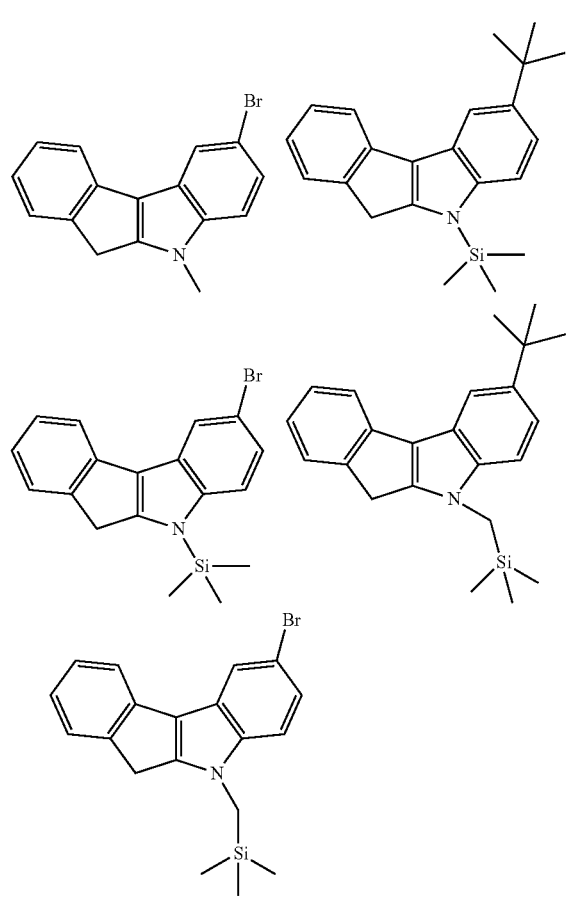

Specific examples of the structure represented by Chemical Formula 6c may include the structures represented by one of the following structural formulas, but are not limited thereto.

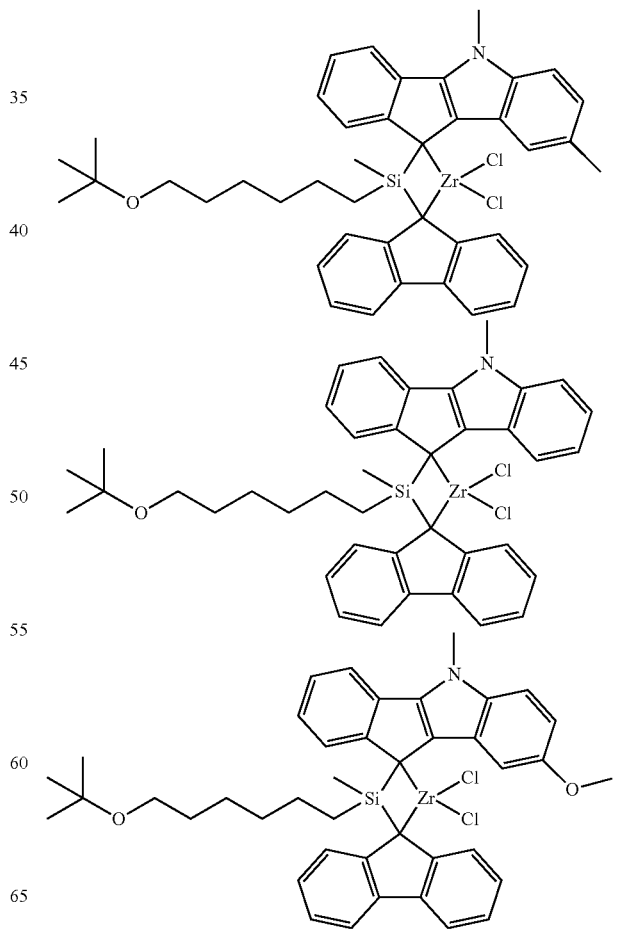

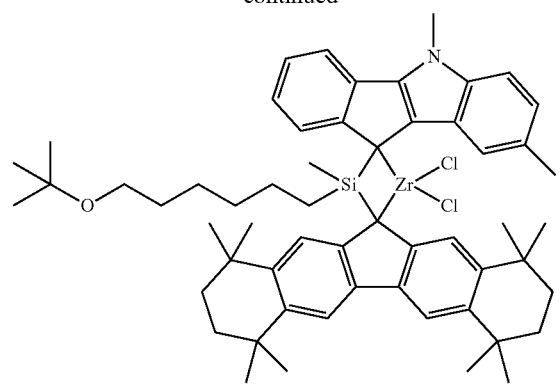
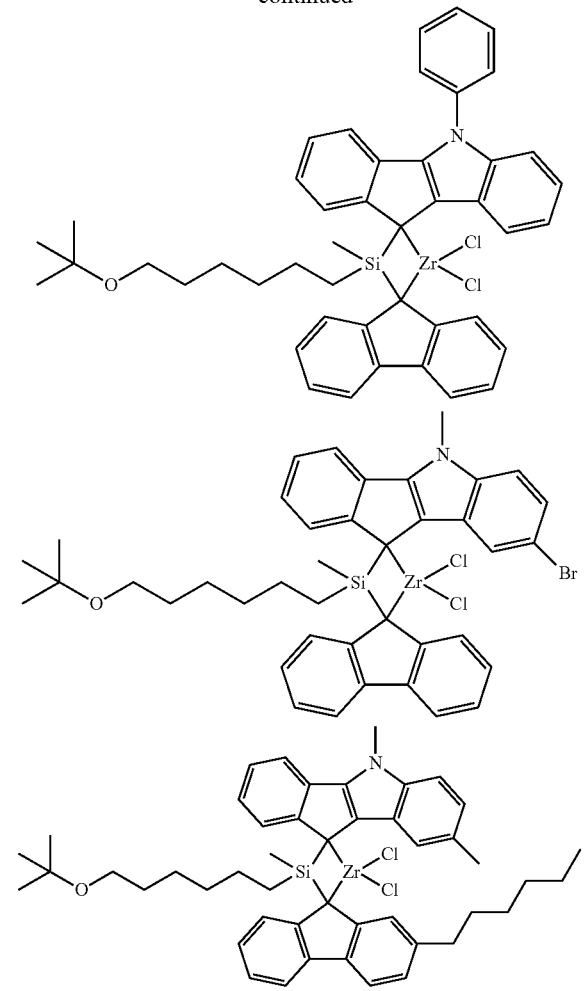
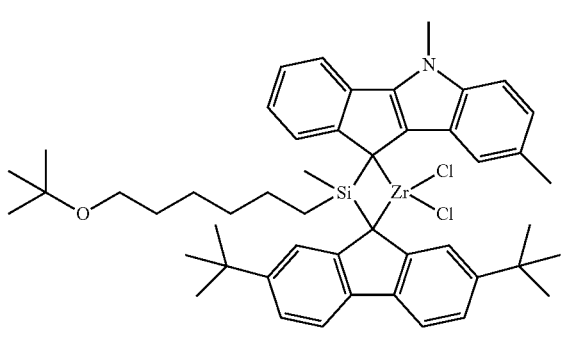
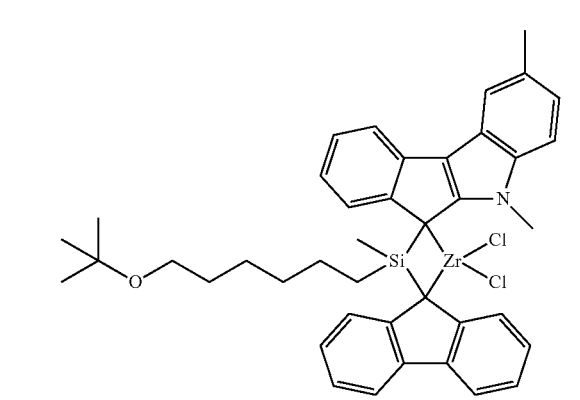
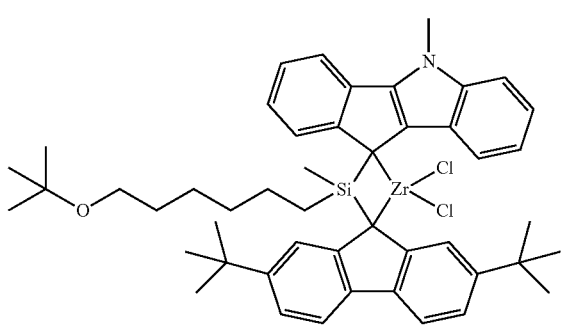
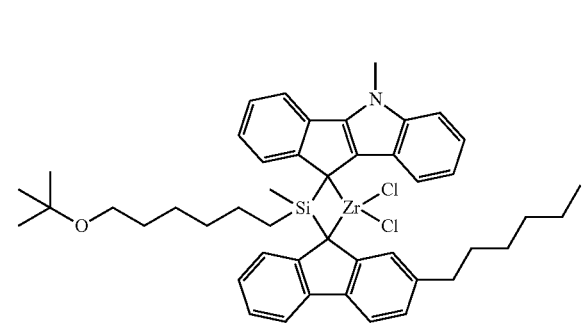

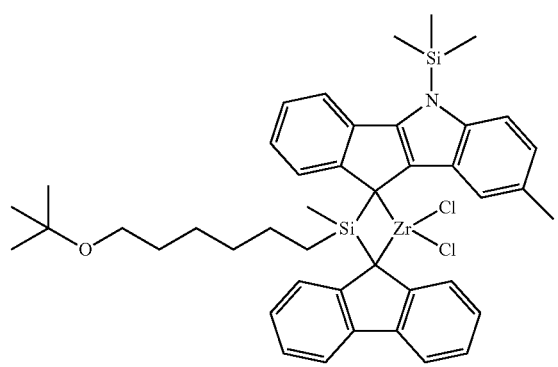

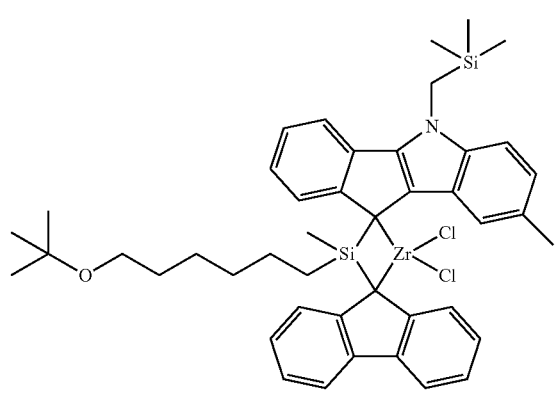

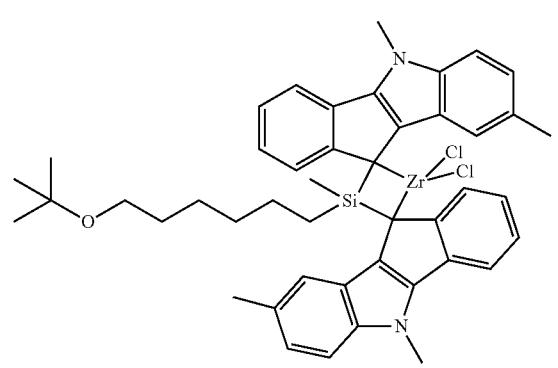

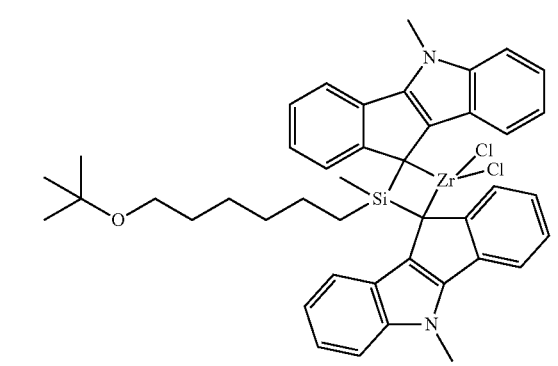

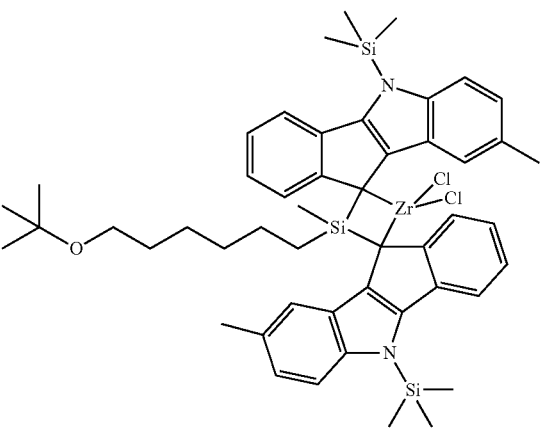

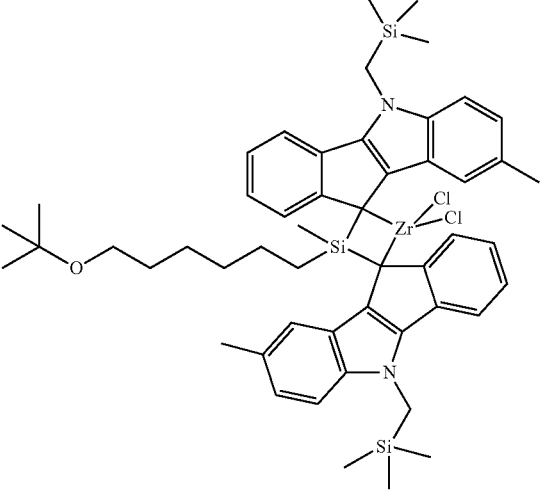

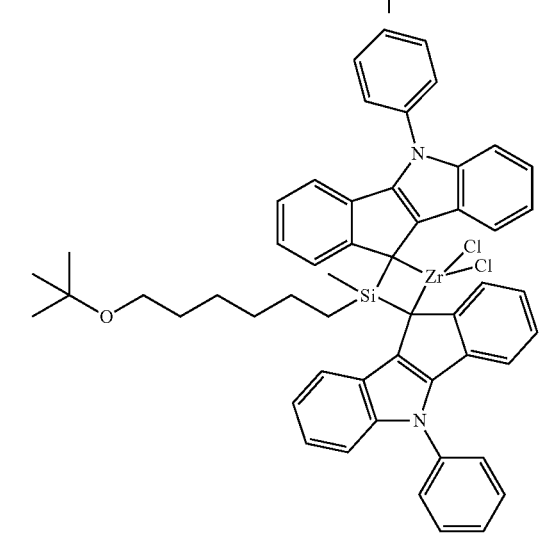

The metallocene compound of Chemical Formula 5 may be obtained by linking an indeno indole derivative and/or fluorene derivative by a bridge compound to prepare a ligand compound, and then introducing a metal precursor compound to conduct metalation, but is not limited thereto.

Meanwhile, the metallocene supported catalyst of the present invention may further include one or more cocatalyst compounds represented by the following Chemical Formula 7 or Chemical Formula 8, in addition to the first cocatalyst compound and the second cocatalyst compound.

$$J(R_{23})_3 \quad \text{[Chemical Formula 7]}$$

In Chemical Formula 7,
each $R_{23}$ may be identical to or different from each other, and are independently a halogen, a C1-20 hydrocarbon, or a C1-20 hydrocarbon substituted with a halogen; and
J is aluminum or boron.

$$[E-H]^+[ZA'_4]^- \text{ or } [E]^+[ZA'_4]^- \quad \text{[Chemical Formula 8]}$$

In Chemical Formula 8,
E is a neutral or cationic Lewis acid;
H is a hydrogen atom;
Z is a Group 13 atom; and
each A may be identical to or different from each other, and are independently a halogen with a hydrogen valence of one or more, a C1-20 hydrocarbon, a C6-20 aryl, or a C1-20 alkyl group unsubstituted or substituted with an alkoxy or a phenoxy group.

Examples of the compound represented by Chemical Formula 7 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, etc., and more preferable compounds are selected among trimethyl aluminum, triethyl aluminum, and triisobutyl aluminum.

Examples of the compound represented by Chemical Formula 8 may include triethylammonium tetra(phenyl)boron, tributylammonium tetra(phenyl)boron, trimethylammonium tetra(phenyl)boron, tripropylammonium tetra(phenyl)boron, trimethylammonium tetra(p-tolyl) boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra(pentafluorophenyl)boron, N,N-diethylanilinium tetra(phenyl)boron, N,N-diethylanilinium tetra(phenyl)boron, N,N-diethylanilinium tetra(pentafluorophenyl)boron, diethylammonium tetra(pentafluorophenyl)boron, triphenylphosphonium tetra(phenyl)boron, trimethylphosphonium tetra(phenyl)boron, triethylammonium tetra(phenyl)aluminum, tributylammonium tetra(phenyl)aluminum, trimethylammonium tetra(phenyl)aluminum, tripropylammonium tetra(phenyl)aluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetra(pentafluorophenyl)aluminum, N,N-diethylanilinium tetra(phenyl)aluminum, N,N-diethylanilinium tetra(phenyl)aluminum, N,N-diethylanilinium tetra(pentafluorophenyl)aluminum, diethylammonium tetra(pentafluorophenyl)aluminum, triphenylphosphonium tetra(phenyl)aluminum, trimethylphosphonium tetra(phenyl)aluminum, tripropylammonium tetra(p-tolyl)boron, triethylammonium tetra(o,p-dimethylphenyl)boron, trimethylphosphonium tetra(phenyl) aluminum, tripropylammonium tetra(p-tolyl)boron, triethylammonium tetra(o,p-dimethylphenyl)boron, tributylammonium tetra(p-trifluoromethylphenyl) boron, triphenylcarbonium tetra(p-trifluoromethylphenyl)boron, triphenylcarbonium tetra(pentafluorophenyl)boron, etc.

If the cocatalyst compound of Chemical Formula 7 or Chemical Formula 8, for example, TEAL or TIBAL, etc., is excessively included, the effects may decrease due to the reaction with the supported catalyst, but it may be overcome by fixation control.

In the metallocene supported catalyst of the present invention, the metallocene compound may be included in the content of about 0.5 to about 20 parts by weight, and the cocatalyst compound of Chemical Formula 7 or Chemical Formula 8 may be included in the content of about 1 to about 1000 parts by weight, based on 100 parts by weight of the carrier. Preferably, the metallocene compound may be included in the content of about 1 to about 15 parts by weight, and the cocatalyst compound of Chemical Formula 7 or Chemical Formula 8 may be included in the content of about 10 to about 500 parts by weight, based on 100 parts by weight of the carrier, and most preferably, the metallocene compound may be included in the content of about 1 to about 10 parts by weight, and the cocatalyst may be included in the content of about 40 to about 150 parts by weight, based on 100 parts by weight of the carrier.

The mass ratio of total transition metal to carrier included in the metallocene compound may be 1:10 to 1:1000. When the carrier and the metallocene compound are included at the above mass ratio, an optimum shape may be exhibited. Further, the mass ratio of the cocatalyst compound of Chemical Formula 7 or 8 to carrier may be 1:1 to 1:100. When the cocatalyst compound of Chemical Formula 7 or 9 and the metallocene compound are included at the above ratio, the activity and the fine structure of the polymer may be optimized.

In the metallocene supported catalyst of the present invention, metals, metal salts, or metal oxides known to be commonly used in catalysts may be used without specific limitations. Specifically, it may include a carrier selected from the group consisting of silica, silica-alumina, and silica-magnesia. Such a carrier may be dried at a high temperature, and commonly, it may include an oxide, carbonate, sulfate, or nitrate of a metal, such as $Na_2O$, $K_2CO_3$, $BaSO_4$, $Mg(NO_3)_2$, etc. Preferably, a carrier having a pore size of 20 nm or more may be used.

Although a lesser amount of hydroxy groups (—OH) on the carrier surface is better, it is practically difficult to remove all hydroxy groups. The amount of hydroxy groups may be controlled by a carrier preparation method as well as preparation conditions and drying conditions (temperature, time, drying method, etc.), and is preferably 0.1 to 10 mmol/g, more preferably 0.1 to 1 mmol/g, and even more preferably 0.1 to 0.5 mmol/g. In order to reduce the side reactions by some hydroxy groups remaining after drying, carriers in which siloxane groups having high reactivity for participating in supporting are preserved and the hydroxy groups are chemically removed, may be used.

The metallocene supported catalyst according to the present invention itself may be used for the polymerization of olefin monomers. The metallocene supported catalyst according to the present invention may be contacted and reacted with olefin monomers, and prepared into a prepolymerized catalyst, and for example, the catalyst may be separately contacted with an olefin monomer such as ethylene, propylene, 1-butene, 1-hexene, 1-octene, etc. and prepared into a prepolymerized catalyst and used.

Meanwhile, the present invention provides a method for preparing the above-explained metallocene supported catalyst. The method for preparing a metallocene supported catalyst includes the steps of supporting two or more kinds of cocatalyst compounds on a carrier, and then supporting one or more kinds of metallocene compounds, wherein among the cocatalyst compounds, the first cocatalyst compound is a compound represented by the following Chemical Formula 1, and the second cocatalyst compound is diethyl zinc.

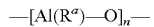 [Chemical Formula 1]

In Chemical Formula 1, each $R^a$ may be identical to or different from each other, and are independently a halogen, a C1-20 hydrocarbon, or a C1-20 hydrocarbon substituted with halogen; and n is an integer of 2 or more.

Particularly, the diethyl zinc may be supported in the content of 0.01 to 3 mmol/g, preferably 0.01 to 1 mmol/g, and more preferably 0.01 to 0.5 mmol/g, based on the weight (g) of the carrier. The diethyl zinc is supported after supporting the first cocatalyst compound, so that at least a part of the diethyl zinc is supported on the first cocatalyst compound. The diethyl zinc should be included in the content of 0.01 mmol/g or more so as to induce modification of molecular weight distribution (MWD), and should be included in the content of 3 mmol/g or less so as to prevent degeneration of polymer properties.

The diethyl zinc may be supported in the content of 0.1 to 30 parts by weight, preferably 0.1 to 24 parts by weight, and more preferably 0.1 to 23 parts by weight, based on the weight of the catalyst precursor metallocene compound. The diethyl zinc may be supported in the content of 0.1 parts by weight or more, so as to induce an effective increase in catalytic activity and modification of molecular weight distribution (MWD). On the other hand, if excessive DEZ is used, the properties of the polymer may be changed by the DEZ, but activity deterioration or polymer color change may be caused according to the amount of DEZ, and if unreacted DEZ exists in a commercial process, process stability may be hindered, and thus it is preferable that the diethyl zinc is included in the content of 30 parts by weight or less, based on the weight of the metallocene compound. As such, according to the present invention, the properties of the polymer may be changed with an amount of DEZ that is about 0.1 times to about 30 times less than the amount of the precursor, and DEZ is pretreated in the supported catalyst instead of being introduced during the process, thus minimizing unreacted DEZ and securing excellent process stability.

In the preparation method of the metallocene supported catalyst according to the present invention, the kind, characteristics, and content of each component of the metallocene compound, cocatalyst compounds, carrier, etc. may be as explained above regarding the metallocene supported catalyst.

According to the present invention, the supporting step may include supporting the first cocatalyst compound of Chemical Formula 1 on a carrier and then supporting the second cocatalyst compound, diethyl zinc, and thereafter, supporting the metallocene compound. Between each supporting step, a washing step using a solvent may be further progressed.

The preparation of the metallocene supported catalyst may be conducted at a temperature of about 0 to about 100° C., and atmospheric pressure, but is not limited thereto.

When preparing the supported catalyst, as a reaction solvent, hydrocarbon solvents such as pentane, hexane, heptane, etc., or aromatic solvents such as benzene, toluene, etc., may be used.

The preparation method of the catalyst may further include steps commonly adopted in the technical field to which the present invention pertains, in addition to the above-explained steps.

Meanwhile, the present invention provides a method for preparing a polyolefin including the step of polymerizing olefin monomers in the presence of the metallocene supported catalyst, and a polyolefin prepared by the preparation method.

Particularly, by using the supported catalyst using DEZ according to the present invention, the wide molecular weight distribution (MWD) of the polymer may be narrowed, and thus transparency of the product may be improved, and melt strength of the polymer that is improved compared to the narrowed molecular weight distribution (MWD) may be maintained.

The olefin monomer may be ethylene, an alpha-olefin, a cyclic olefin, a diene, or a triene having two or more double bonds.

Specific examples of the olefin monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicylcopentadiene, 1,4-butadiene, 1,5-pentadiene, 1,6-hexadiene, styrene, alpha-methylstyrene, divinylbenzene, 3-chloromethlystyrene, etc., and two or more kinds of the monomers may be mixed and copolymerized.

The polymerization reaction may be progressed by homopolymerizing one kind of olefin monomers or copolymerizing two or more kinds of monomers, using one of a continuous type of slurry polymerization reactor, a loop slurry reactor, a gas phase reactor, a solution reactor, etc.

The metallocene supported catalyst may be dissolved or diluted in a C5-12 aliphatic hydrocarbon solvent such as pentane, hexane, heptane, nonane, decane, and isomers thereof, an aromatic hydrocarbon solvent such as toluene and benzene, or a chlorine-substituted hydrocarbon solvent such as dichloromethane, chlorobenzene, etc., and introduced. Here, it is preferable that the solvent is treated with a small amount of alkyl aluminum to remove a small amount of water or air, etc. acting as a catalyst poison, before use, and it may be conducted by additionally using cocatalysts.

The polymerization of olefin monomers may be conducted at a temperature of about 25 to about 500° C. and at a pressure of about 1 to about 100 kgf/cm² for about 1 to about 24 hours. Specifically, the polymerization of olefin monomers may be conducted at a temperature of about 25 to about 500° C., preferably about 25 to about 200° C., and more preferably about 50 to about 100° C. Further, it may be conducted at a reaction pressure of about 1 to about 100 kgf/cm², preferably about 1 to about 50 kgf/cm², and more preferably about 5 to about 40 kgf/cm².

Specific examples of the olefin monomers may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, etc., and two or more kinds thereof may be mixed and copolymerized.

The polyolefin may be a polyethylene polymer, but is not limited thereto.

In case the polyolefin is an ethylene/alpha olefin copolymer, and the content of the comonomer alpha olefin is not specifically limited, and may be appropriately selected according to the use and purpose of the polyolefin. More specifically, it may be greater than 0 and 99 mol % or less.

If the polyolefin is prepared using the metallocene supported catalyst of the present invention, a polyolefin having a narrow molecular weight distribution and excellent mechanical properties such as melt strength, etc. may be prepared. The polyolefin has excellent processibility, as well as excellent physical properties.

Particularly, the metallocene supported catalyst of the present invention exhibits excellent activity, and the polyolefin prepared using the metallocene supported catalyst of the present invention exhibits a molecular weight distribution (MWD) of about 2.3 to about 4.0 or about 2.3 to about 3.5, preferably about 2.4 to about 3.4, and more preferably 2.5 to about 3.3, thus exhibiting excellent processibility. The Mz/Mw of the polyolefin may be about 2.0 to about 3.2, preferably about 2.2 to about 3.1, and more preferably 2.3 to about 3.0. It is preferable that the molecular weight distribution (MWD) and Mz/Mw of the polyolefin are respectively about 2.3 or more and about 2.0 or more so as to improve processibility and mechanical properties of the polymer, and respectively about 4.0 or less and about 3.2 or less so as to secure excellent transparency when processed into a film, etc.

Meanwhile, the polyolefin prepared using the metallocene supported catalyst of the present invention may have weight average molecular weight (Mw) of about 50,000 to about 5,000,000 g/mol, about 60,000 to about 1,000,000 g/mol, or about 70,000 to about 500,000 g/mol. In addition, according to one embodiment of the present invention, the density of the polyolefin may be about 0.85 to about 0.96 g/cm$^3$, and preferably about 0.90 to about 0.95 g/cm$^3$.

The metallocene supported catalyst of the present invention can effectively polymerize olefin monomers with excellent activity in the polyolefin preparation process. Particularly, the activity of the metallocene supported catalyst may be 4.5 kg/gCat·h or more, or 4.5 to 30 kg/gCat·h, preferably 4.7 kg/gCat·h or more, and more preferably 4.9 kg/gCat·h or more, when calculated as a ratio of weight (kg) of produced polymer per unit weight content (g) of catalyst used per unit time (h).

Hereinafter, preferable examples will be presented for better understanding of the present invention. However, the following examples are presented only for better understanding of the present invention, and the scope of the present invention is not limited thereby.

EXAMPLES

Examples of Preparation of Metallocene Supported Catalyst

Catalyst Preparation Examples 1 to 4

Into a glass reactor, 53 mL of a 10 wt % methylaluminoxane (MAO)/toluene solution was introduced, and 7 g of silica was introduced at 40° C., and then the solution was stirred while raising the temperature of the reactor to 95° C. The solution was stirred at 200 rpm for 16 hours. Thereafter, the temperature was lowered to 40° C., and then diethyl zinc (DEZ) was introduced and stirred for 1 hour, at the equivalents (0.1-3 mmol/g SiO$_2$) shown in the following Table 1. Thereafter, 500 mg (0.1 mmol/g SiO$_2$) of the metallocene compound represented by the following Chemical Formula 9 (catalyst precursor 1) was dissolved into a solution state at 80° C., and then stirred for 2 hours. After the temperature was lowered to 40° C., stirring was stopped, and a toluene layer was separated and removed, and then remaining toluene was removed by pressure reduction at 40° C., thus preparing a metallocene supported catalyst.

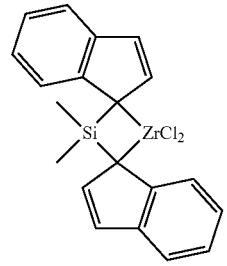

[Chemical Formula 9]

Comparative Catalyst Preparation Example 1

A metallocene supported catalyst was prepared by the same method as Catalyst Preparation Example 1, except that the diethyl zinc (DEZ) treating process was not conducted after supporting methylaluminoxane (MAO) on the carrier.

Catalyst Preparation Examples 5 to 8

A metallocene supported catalyst was prepared by the same method as Catalyst Preparation Example 1, except using the metallocene compound represented by the following Chemical Formula 10 (catalyst precursor 2) as a catalyst precursor.

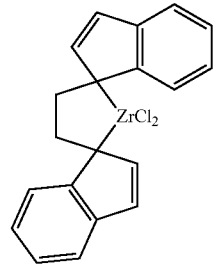

[Chemical Formula 10]

Comparative Catalyst Preparation Example 2

A metallocene supported catalyst was prepared by the same method as Catalyst Preparation Example 5, except that the diethyl zinc (DEZ) treating process was not conducted after supporting methylaluminoxane (MAO) on the carrier.

Comparative Catalyst Preparation Example 3

A metallocene supported catalyst was prepared by the same method as Catalyst Preparation Example 1, except that the diethyl zinc (DEZ) was introduced in the content of 0.05 mmol/g SiO$_2$, based on the weight of the carrier.

Comparative Catalyst Preparation Example 4

A metallocene supported catalyst was prepared by the same method as Catalyst Preparation Example 1, except that the diethyl zinc (DEZ) was introduced in the content of 3.5 mmol/g SiO$_2$, based on the weight of the carrier.

Comparative Catalyst Preparation Example 5

A metallocene supported catalyst was prepared by the same method as Catalyst Preparation Example 5, except that the diethyl zinc (DEZ) was introduced in the content of 0.05 mmol/g $SiO_2$, based on the weight of the carrier.

Comparative Catalyst Preparation Example 6

A metallocene supported catalyst was prepared by the same method as Catalyst Preparation Example 5, except that the diethyl zinc (DEZ) was introduced in the content of 3.5 mmol/g $SiO_2$, based on the weight of the carrier.

Examples of Polyethylene Polymerization

Polymerization Examples 1 to 8 and Polymerization Comparative Examples 1 to 8: Homopolymerization of Ethylene Under the conditions shown in the following Table 1, ethylene homopolymerization was conducted using each metallocene supported catalyst prepared in Catalyst Preparation Examples 1 to 8 and Catalyst Comparative Preparation Examples 1 to 8.

First, 400 mL of hexane was put into an isolated system using a Parr reactor and filled with argon, then 1 g of trimethylaluminum was added to dry the inside of the reactor, and the hexane was discarded. Again, 400 mL of hexane was filled therein, and then 0.5 g of triisobutylaluminum was added. In a glove box filled with argon, the supported catalyst weighing 7 mg was put into the reactor, followed by argon ventilation, pressurization to 30 bar ethylene pressure at 78° C., and polymerization for 0.5 hours.

TABLE 1

| | Supported catalyst | DEZ content (mmol/g $SiO_2$) | DEZ Introduction time | ind of metallocene compound | Content of metallocene compound (mmol/g $SiO_2$) |
|---|---|---|---|---|---|
| Example 1 | Preparation Example 1 | 0.1 | During supporting | Catalyst precursor 1 | 0.1 |
| Example 2 | Preparation Example 2 | 0.3 | During supporting | Catalyst precursor 1 | 0.1 |
| Example 3 | Preparation Example 3 | 1.0 | During supporting | Catalyst precursor 1 | 0.1 |
| Example 4 | Preparation Example 4 | 3.0 | During supporting | Catalyst precursor 1 | 0.1 |
| Comparative Example 1 | Comparative Preparation Example 1 | — | — | Catalyst precursor 1 | 0.1 |
| Comparative Example 2 | Comparative Preparation Example 1 | 3.0 | During polymerization | Catalyst precursor 1 | 0.1 |
| Example 5 | Preparation Example 5 | 0.1 | During supporting | Catalyst precursor 2 | 0.1 |
| Example 6 | Preparation Example 6 | 0.3 | During supporting | Catalyst precursor 2 | 0.1 |
| Example 7 | Preparation Example 7 | 1.0 | During supporting | Catalyst precursor 2 | 0.1 |
| Example 8 | Preparation Example 8 | 3.0 | During supporting | Catalyst precursor 2 | 0.1 |
| Comparative Example 3 | Comparative Preparation Example 2 | — | — | Catalyst precursor 2 | 0.1 |
| Comparative Example 4 | Comparative Preparation Example 2 | 3.0 | During polymerization | Catalyst precursor 2 | 0.1 |
| Comparative Example 5 | Comparative Preparation Example 3 | 0.05 | During supporting | 촉매전구체 1 Catalyst precursor | 0.1 |
| Comparative Example 6 | Comparative Preparation Example 4 | 3.5 | During supporting | Catalyst precursor 1 | 0.1 |
| Comparative Example 7 | Comparative Preparation Example 5 | 0.05 | During supporting | Catalyst precursor 2 | 0.1 |
| Comparative Example 8 | Comparative Preparation Example 6 | 3.5 | During supporting | Catalyst precursor 2 | 0.1 |

For the prepared polyethylene polymers of Examples 1 to 8 and Comparative Examples 1 to 8, property evaluation was conducted as follows, and the results are shown in the following Table 2.

(1) Catalytic activity: calculated as a ratio of the weight (kg PE) of the polymer produced per content of used catalyst (g of catalyst) per unit time (h).

(2) Molecular weight distribution of polymer (MWD): weight average molecular weight (Mw) and number average molecular weight (Mn) of the polymer were measured by a method using nGPC, and the molecular weight distribution (MWD) was calculated by dividing the weight average molecular weight by the number average molecular weight.

(3) MI2.16 of polymer: measured under a load of 2.16 kg at 190° C. according to ASTM D 1238, and indicated as the weight (g) of molten polymer for 10 minutes.

(4) MI10 of polymer: measured under a load of 10 kg at 190° C. according to ASTM D 1238, and indicated as the weight (g) of molten polymer for 10 minutes.

(5) Melt flow rate ratio (MFRR) of polymer: indicated as the MI10/MI2.16 value measured according to ASTM D 1238.

(6) Morphology of polymer: bulk density of powder polymer was measured, and if the weight of powder weighed by pouring into a 100 mL BD measuring instrument was 33 g or more, the polymer morphology was good and indicated as "Good", and if it was less than 33 g, the polymer morphology was not good and indicated as "Bad".

(7) Color of polymer: discoloration of polymer was confirmed with the unaided eye.

(8) Transparency of polymer: it was confirmed whether or not a polymer shoulder was generated based on MWD.

TABLE 2

|  | Activity (kg PE/g cat/h) | Mw (*1000) | MWD | Mz/Mw | MI2.16 | MI10 | MFRR | Morphology | Color |
|---|---|---|---|---|---|---|---|---|---|
| Example 1 | 10.5 | 173 | 3.3 | 3.0 | 0.4 | 5.6 | 14 | Good | White |
| Example 2 | 10.3 | 163 | 2.8 | 2.9 | 0.5 | 6.5 | 13 | Good | White |
| Example 3 | 7.7 | 92 | 2.6 | 2.7 | 1.7 | 13.6 | 8 | Good | White |
| Example 4 | 6.0 | 89 | 2.5 | 2.9 | 2.9 | 20.3 | 7 | Good | White |
| Comparative Example 1 | 7.0 | 293 | 4.8 | 4.5 | 0.1 | 1.6 | 16 | Good | White |
| Comparative Example 2 | 2.1 | 30 | 2.2 | 2.3 | 10 | 65 | 6.5 | Bad | Gray |
| Example 5 | 9.1 | 155 | 3.1 | 3.0 | 0.6 | 7.4 | 13 | Good | White |
| Example 6 | 8.5 | 143 | 2.9 | 2.8 | 0.7 | 8.4 | 12 | Good | White |
| Example 7 | 6.2 | 87 | 2.5 | 2.4 | 3.3 | 23.1 | 7 | Good | White |
| Example 8 | 4.9 | 82 | 2.5 | 2.3 | 3.8 | 26.6 | 7 | Good | White |
| Comparative Example 3 | 5.3 | 276 | 4.6 | 4.3 | 0.07 | 1.0 | 17 | Good | White |
| Comparative Example 4 | 1.3 | 24 | 2.2 | 2.2 | 13 | 81 | 6.2 | Bad | Gray |
| Comparative Example 5 | 7.1 | 270 | 4.3 | 4.2 | 0.1 | 1.5 | 15 | Good | White |
| Comparative Example 6 | 4.3 | 73 | 2.2 | 2.2 | 4.0 | 26 | 6.5 | Good | White |
| Comparative Example 7 | 5.3 | 260 | 4.2 | 4.3 | 0.1 | 1.6 | 16 | Good | White |
| Comparative Example 8 | 3.9 | 69 | 2.3 | 2.2 | 5.3 | 33.3 | 6.3 | Good | White |

As shown in Table 2, according to the present invention, a polyethylene polymer simultaneously satisfying high processibility and transparency can be prepared with high catalytic activity. Particularly, according to the present invention, there is no problem in terms of polymerization process because DEZ is not added during polymerization, and the color of a produced polymer is not influenced because the intrinsic activity of the catalyst is not damaged.

Particularly, it can be seen that in the case of Examples 1 to 8 using the metallocene supported catalyst according to the present invention, high catalytic activities of 4.9 kg/gCat·h or more is maintained, and simultaneously, the MWD and Mz/Mw of polyethylene are respectively 3.3 or less and 3.0 or less, thus realizing excellent transparency.

As explained above, the supported catalyst with optimized use of DEZ according to the present invention has the characteristics of an increase in polymerization activity and the capability of controlling MWD. Particularly, DEZ is not introduced during the process, but DEZ acts most efficiently in the carrier during polymerization, thereby most efficiently controlling the molecular structure with a minimum DEZ content. This is environmentally friendly in terms of atom economy, and can be a great help to process stability due to the minimization of the introduction of foreign bodies into the reactor.

The invention claimed is:

1. A metallocene supported catalyst comprising:
one or more kinds of metallocene compounds,
two or more kinds of cocatalyst compounds, and
a carrier,
wherein the cocatalyst compounds include a first cocatalyst compound represented by the following Chemical Formula 1 and diethyl zinc as a second cocatalyst compound, and
the diethyl zinc is included in the content of 0.1 to 3 mmol/g, based on the weight (g) of the carrier, and at least a part of the diethyl zinc is supported on the first cocatalyst compound:

$$-[Al(R^a)-O]_n-$$ [Chemical Formula 1]

wherein, in Chemical Formula 1,
each $R^a$ is identical to or different from each other, and are independently a halogen, a C1-20 hydrocarbon, or a C1-20 hydrocarbon substituted with a halogen; and
n is an integer of 2 or more.

2. The metallocene supported catalyst according to claim 1, wherein the compound represented by Chemical Formula 1 is methylaluminoxane, ethylaluminoxane, isobutylaluminoxane or butylaluminoxane.

3. The metallocene supported catalyst according to claim 1, wherein the metallocene compound is represented by the following Chemical Formulae 2 to 5:

$$(Cp^5R^b)_n(Cp^6R^c)M^1Z^1_{3-n}$$ [Chemical Formula 2]

wherein, in Chemical Formula 2,
$M^1$ is Group 4 transition metal;
$Cp^5$ and $Cp^6$ are identical to or different from each other, and are independently one selected from the group consisting of cyclopentadienyl, indenyl, 4,5,6,7-tetrahydro-1-indenyl, and fluorenyl radicals, which are substituted with a C1-20 hydrocarbon;

$R^b$ and $R^c$ are identical to or different from each other, and are independently hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^1$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy; and n is 1 or 0,

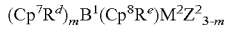 [Chemical Formula 3]

wherein, in Chemical Formula 3, $M^2$ is Group 4 transition metal;

$Cp^7$ and $Cp^8$ are identical to or different from each other, and are independently one selected from the group consisting of cyclopentadienyl, indenyl, 4,5,6,7-tetrahydro-1-indenyl, and fluorenyl radicals, which are substituted with a C1-20 hydrocarbon;

$R^d$ and $R^e$ are identical to or different from each other, and are independently hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^2$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C2-20 alkylalkoxy, or a C7-40 arylalkoxy;

$B^1$ is one or more selected from carbon, germanium, silicon, phosphorous, or nitrogen atom-containing radicals or a combination thereof, which crosslinks a $Cp^7R^d$ ring with a $Cp^8R^e$ ring, or crosslinks one $Cp^8R^e$ ring to $M^2$; and m is 1 or 0,

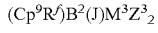 [Chemical Formula 4]

wherein, in Chemical Formula 4, $M^3$ is Group 4 transition metal;

$Cp^9$ is one selected from the group consisting of cyclopentadienyl, indenyl, 4,5,6,7-tetrahydro-1-indenyl, and fluorenyl radicals, which are substituted with a C1-20 hydrocarbon;

$R^f$ is hydrogen, a C1-20 alkyl, a C1-10 alkoxy, a C2-20 alkoxyalkyl, a C6-20 aryl, a C6-10 aryloxy, a C2-20 alkenyl, a C7-40 alkylaryl, a C7-40 arylalkyl, a C8-40 arylalkenyl, or a C2-10 alkynyl;

$Z^3$ is a halogen atom, a C1-20 alkyl, a C2-10 alkenyl, a C7-40 alkylaryl, a C7-40 arylalkyl, a C6-20 aryl, a substituted or unsubstituted C1-20 alkylidene, a substituted or unsubstituted amino group, a C1-20 alkylalkoxy, or a C7-40 arylalkoxy;

$B^2$ is one or more selected from carbon, germanium, silicon, phosphorous, or nitrogen atom-containing radicals or a combination thereof, which crosslinks a $Cp^9R^f$ ring with J; and J is one selected from the group consisting of $NR^g$, O, $PR^g$, and S, and $R^g$ is a C1-20 alkyl, aryl, substituted alkyl, or substituted aryl,

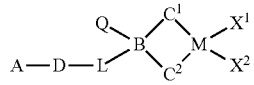 [Chemical Formula 5]

wherein, in Chemical Formula 5,

A is hydrogen, a halogen, a C1-20 alkyl, a C2-20 alkenyl, a C6-20 aryl, a C7-20 alkylaryl, a C7-20 arylalkyl, a C1-20 alkoxy, a C2-20 alkoxyalkyl, a C3-20 heterocycloalkyl, or a C5-20 heteroaryl;

D is —O—, —S—, —N(R)—, or —Si(R)(R')—, wherein R and R' are identical to or different from each other, and are independently hydrogen, a halogen, a C1-20 alkyl, a C2-20 alkenyl, or a C6-20 aryl;

L is a C1-10 linear or branched alkylene group;

B is carbon, silicon, or germanium;

Q is hydrogen, a halogen, a C1-20 alkyl, a C2-20 alkenyl, a C6-20 aryl, a C7-20 alkylaryl, or a C7-20 arylalkyl;

M is a Group 4 transition metal;

$X^1$ and $X^2$ are identical to or different from each other, and are independently a halogen, a C1-20 alkyl, a C2-20 alkenyl, a C6-20 aryl, a nitro, an amido, a C1-20 alkylsilyl, a C1-20 alkoxy, or a C1-20 sulfonate group; and $C^1$ and $C^2$ are identical to or different from each other, and are independently represented by one of the following Chemical Formula 6a, Chemical Formula 6b, or Chemical Formula 6c, provided that both $C^1$ and $C^2$ are not Chemical Formula 6c:

[Chemical Formula 6a]

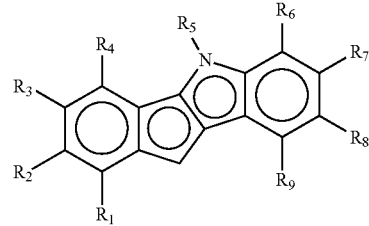

[Chemical Formula 6b]

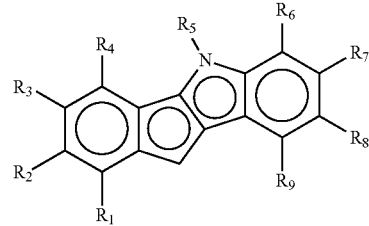

[Chemical Formula 6c]

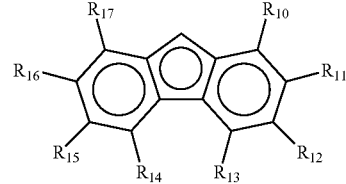

wherein, in Chemical Formulas 6a, 6b, and 6c, R1 to R17 and R1' to R9' are identical to or different from each other, and are independently hydrogen, a halogen, a C1-20 alkyl, a C2-20 alkenyl, a C1-20 alkylsilyl, a C1-20 silylalkyl, a C1-20 alkoxysilyl, a C1-20 alkoxy, a C6-20 aryl, a C7-20 alkylaryl, or a C7-20 arylalkyl group, and two or more neighboring groups of the R10 to R17 are linked to form a substituted or unsubstituted aliphatic or aromatic ring.

4. The metallocene supported catalyst according to claim 1, wherein the cocatalyst compounds include, at least one compound represented by a compound of Chemical Formula 7 or a compound of Chemical Formula 8:

$$J(R_{23})_3 \quad \text{[Chemical Formula 7]}$$

wherein, in Chemical Formula 7,
each R23 is identical to or different from each other, and are is independently a halogen, a C1-20 hydrocarbon, or a C1-20 hydrocarbon substituted with a halogen; and
J is aluminum or boron, $$[E-H]^+[ZA'_4]^- \text{ or } [E]^+[ZA'_4]^- \quad \text{[Chemical Formula 8]}$$

wherein, in Chemical Formula 8,
E is a neutral or cationic Lewis acid;
H is a hydrogen atom;
Z is a Group 13 atom; and
each A is identical to or different from each other, and is independently a C6-20 aryl or a C1-20 alkyl group, in which at least one hydrogen atom is unsubstituted or substituted with a halogen, a C1-20 hydrocarbon, an alkoxy or a phenoxy group.

5. The metallocene supported catalyst according to claim 1, wherein the carrier is silica, silica-alumina or silica-magnesia.

6. A method for preparing a metallocene supported catalyst comprising:
supporting two or more kinds of cocatalyst compounds including a first cocatalyst compound and a second cocatalyst compound on a carrier, and then supporting one or more kinds of metallocene compounds,
wherein the first cocatalyst compound is a compound represented by the following Chemical Formula 1 and the second cocatalyst compound is diethyl zinc, and
the diethyl zinc is supported in the content of 0.1 to 3 mmol/g based on the weight (g) of the carrier, after the first cocatalyst compound is supported:

$$-[Al(R^a)-O]_n- \quad \text{[Chemical Formula 1]}$$

wherein, in Chemical Formula 1,
each $R^a$ is identical to or different from each other, and are independently a halogen, a C1-20 hydrocarbon, or a C1-20 hydrocarbon substituted with a halogen; and
n is an integer of 2 or more.

7. A method for preparing a polyolefin comprising the step of polymerizing olefin monomers in the presence of the metallocene supported catalyst of claim 1.

8. The method for preparing a polyolefin according to claim 7, wherein the polymerization is a solution polymerization process, a slurry process or a gas phase process.

9. The method for preparing a polyolefin according to claim 7, wherein the olefin monomers include one or more of ethylene, propylene, 1-butene, 1-hexene, 1-octene, 1-pentene, 4-methyl-1-pentene, 1-hexene, 1-heptene, 1-decene, 1-undecene, 1-dodecene, norbornene, ethylidene norbornene, styrene, alpha-methylstyrene, or 3-chloromethylstyrene.

* * * * *